Oct. 8, 1940.  J. W. BRYCE ET AL  2,217,196
CONVERTIBLE ACCOUNTING MACHINE
Filed Aug. 7, 1935   18 Sheets-Sheet 1

INVENTORS
James W. Bryce
Arthur H. Dickinson
BY Cooper Kerr & Dunham
ATTORNEYS

Oct. 8, 1940.   J. W. BRYCE ET AL   2,217,196
CONVERTIBLE ACCOUNTING MACHINE
Filed Aug. 7, 1935   18 Sheets-Sheet 2

INVENTORS
James W. Bryce
Arthur H. Dickinson
BY Cooper Kerr & Dunham
ATTORNEYS

Oct. 8, 1940.　　　J. W. BRYCE ET AL　　　2,217,196
CONVERTIBLE ACCOUNTING MACHINE
Filed Aug. 7, 1935　　　18 Sheets-Sheet 3

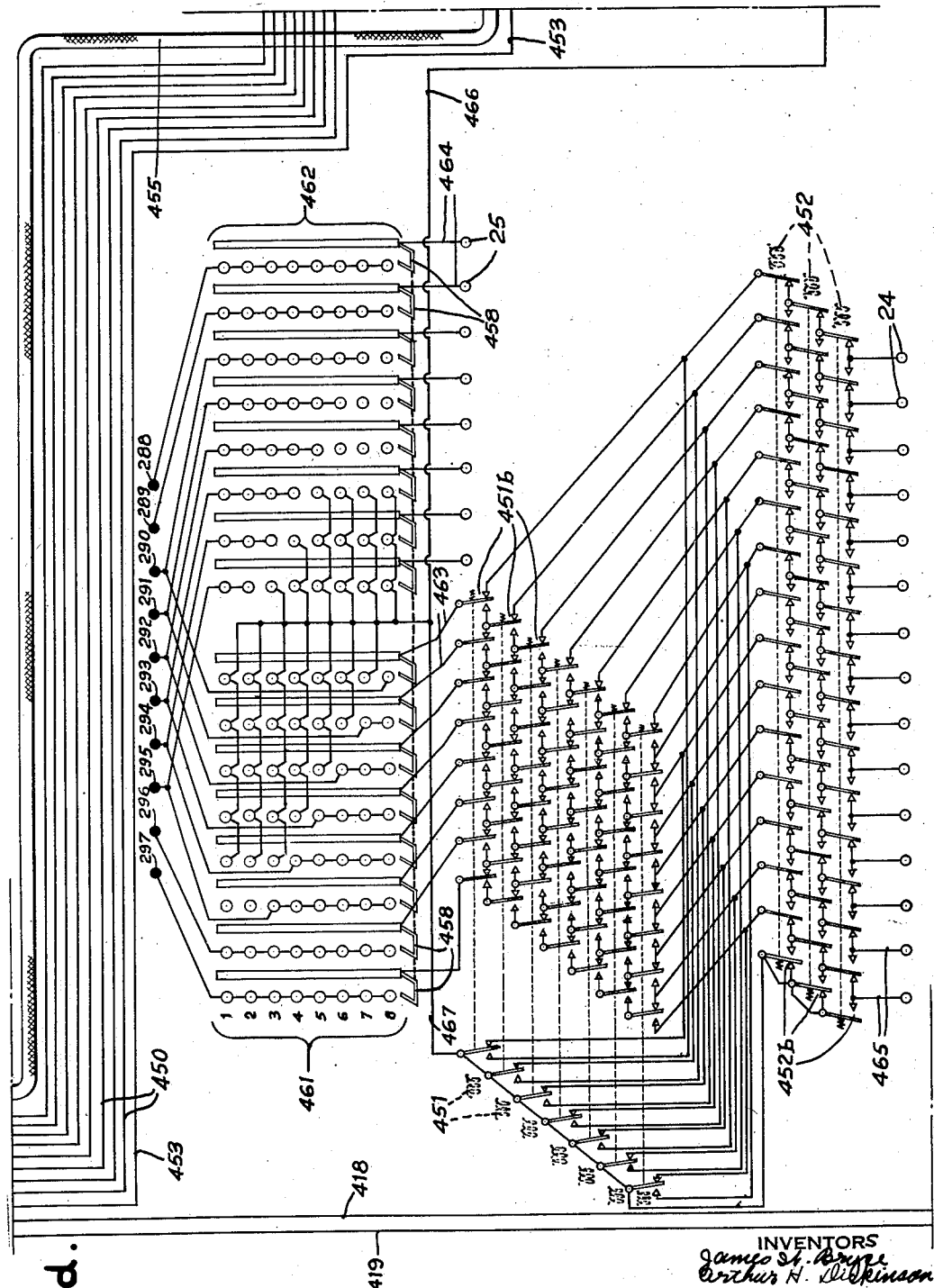

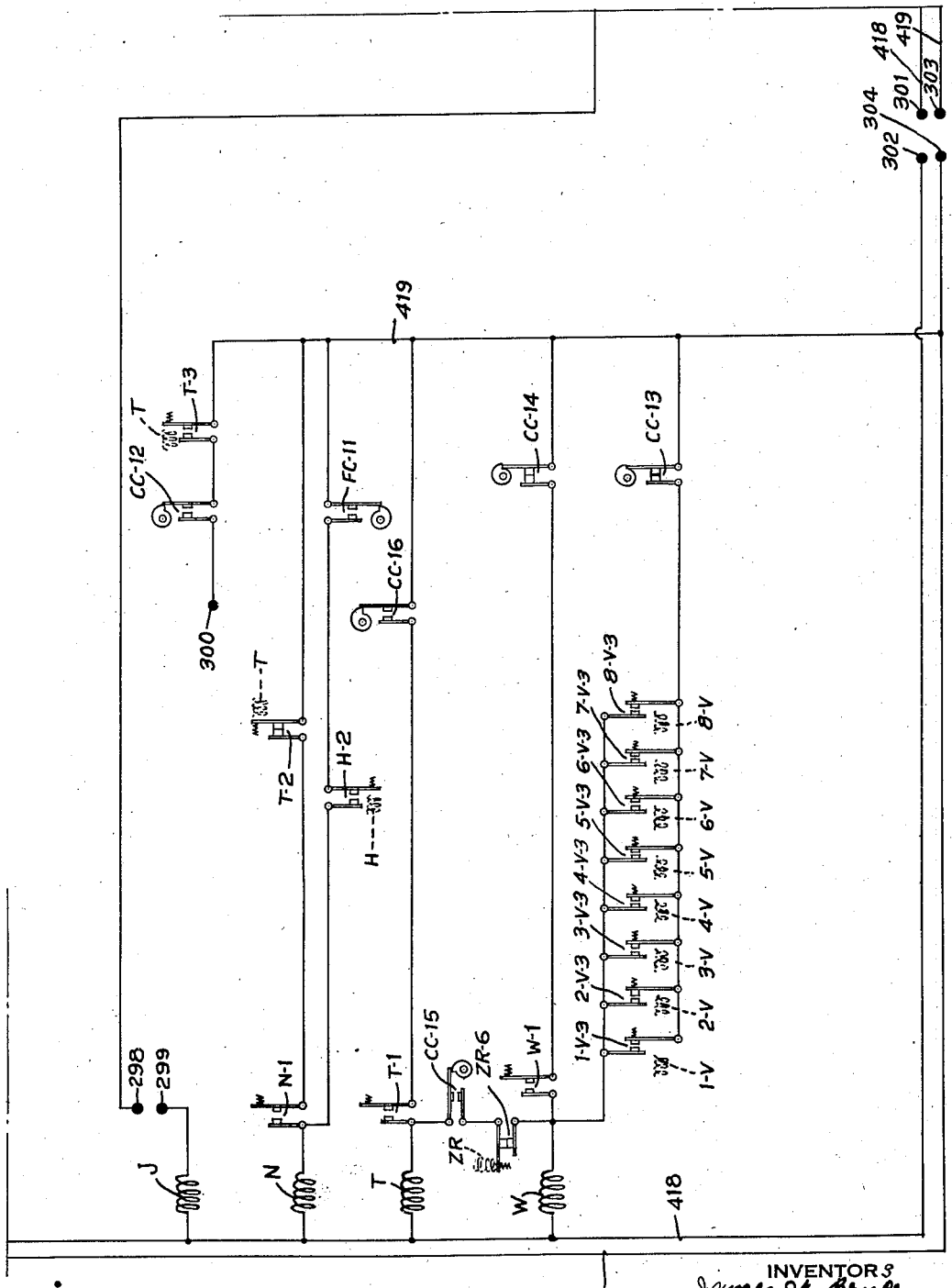

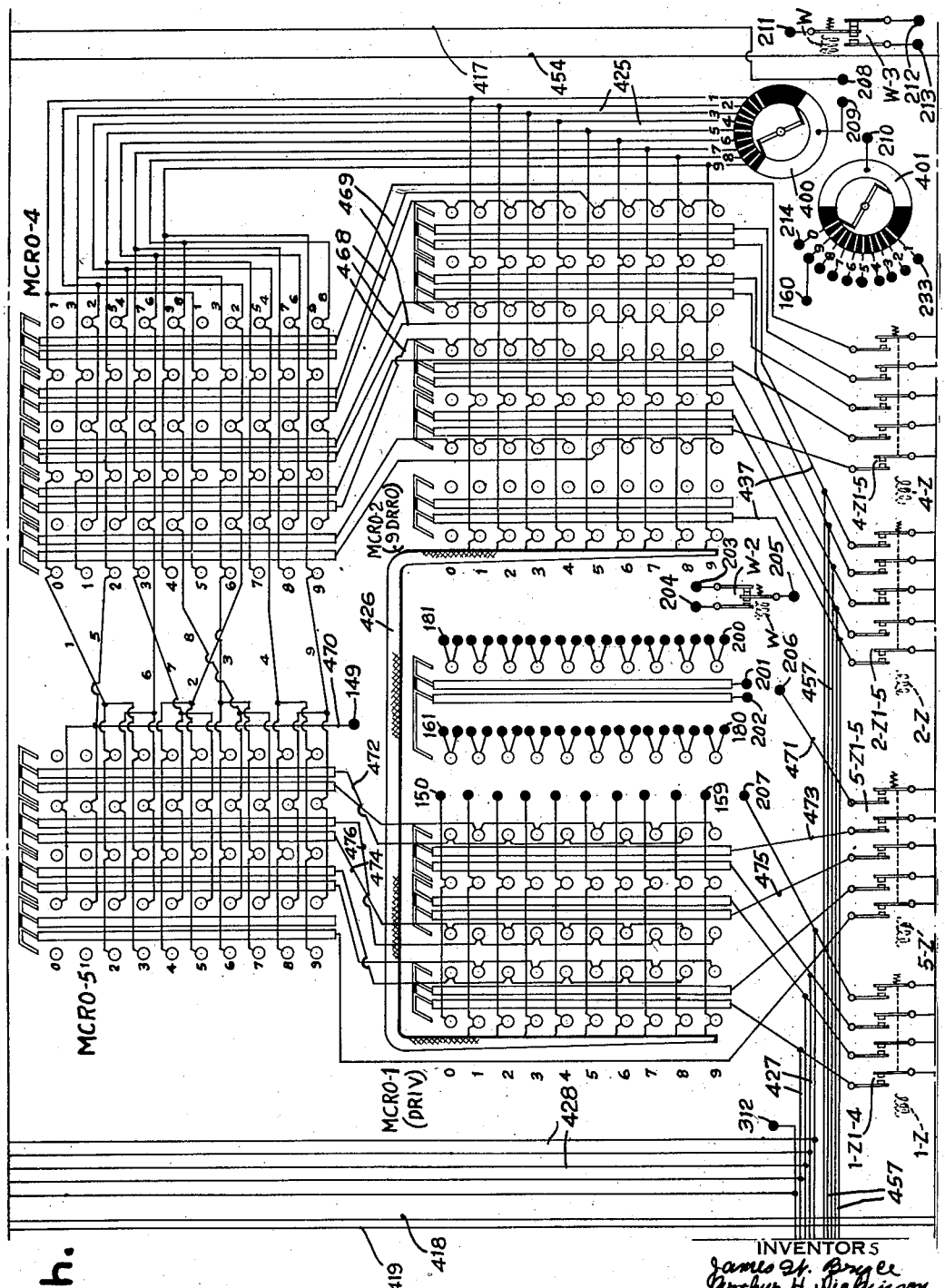

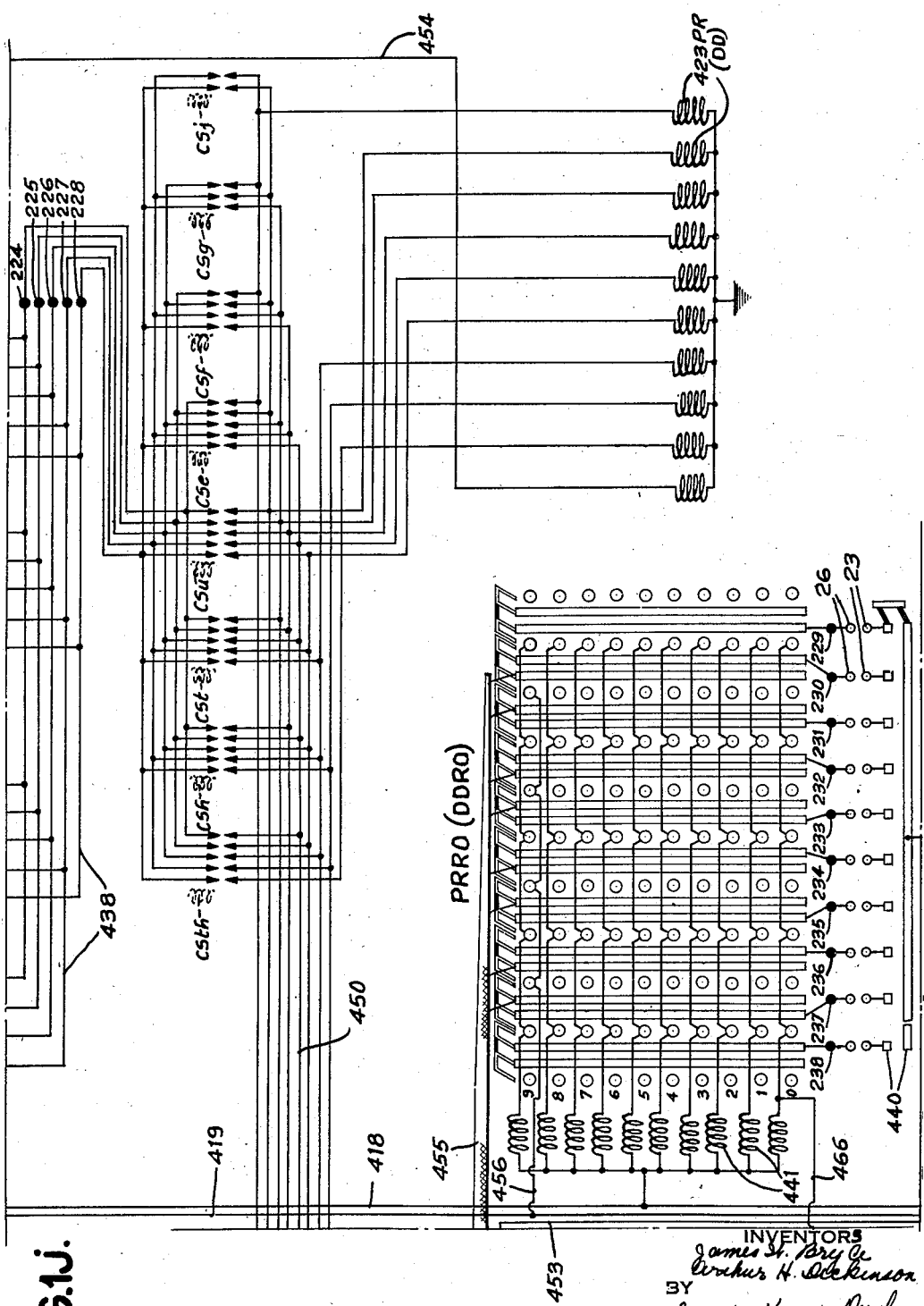

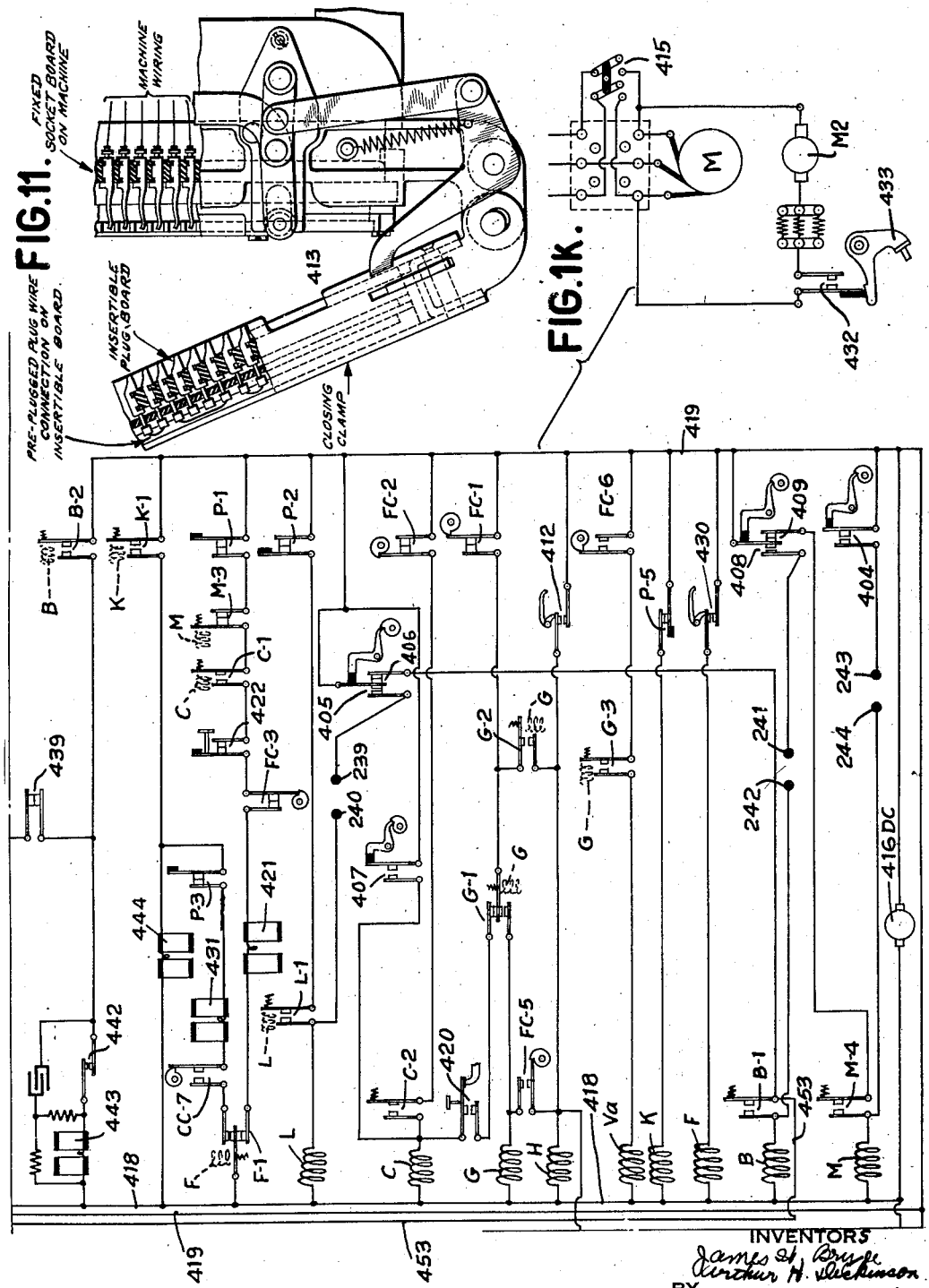

Oct. 8, 1940.  J. W. BRYCE ET AL  2,217,196
CONVERTIBLE ACCOUNTING MACHINE
Filed Aug. 7, 1935  18 Sheets-Sheet 11
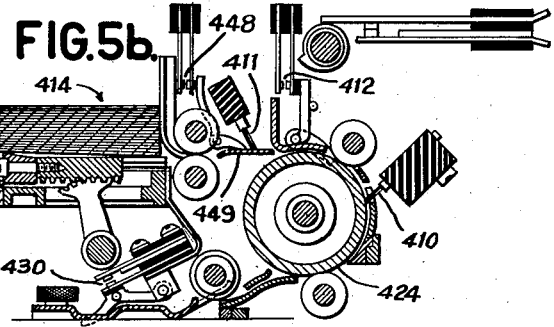
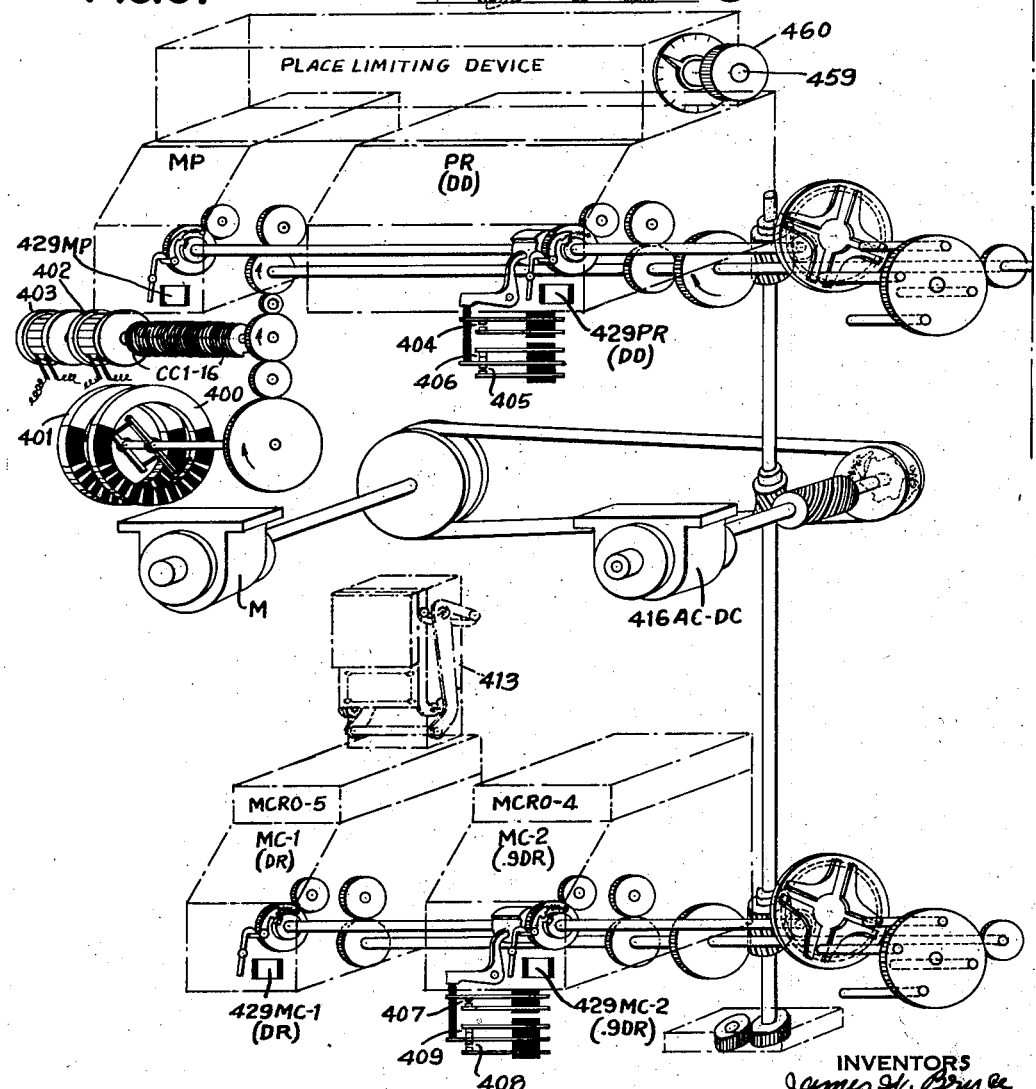

Oct. 8, 1940.   J. W. BRYCE ET AL   2,217,196
CONVERTIBLE ACCOUNTING MACHINE
Filed Aug. 7, 1935   18 Sheets-Sheet 12

Problem
12×4802=57624

INVENTORS
James W. Bryce
Arthur H. Dickinson
BY
Cooper, Kerr & Dunham
ATTORNEYS

Oct. 8, 1940.  J. W. BRYCE ET AL  2,217,196
CONVERTIBLE ACCOUNTING MACHINE
Filed Aug. 7, 1935   18 Sheets-Sheet 13

Oct. 8, 1940.   J. W. BRYCE ET AL   2,217,196
CONVERTIBLE ACCOUNTING MACHINE
Filed Aug. 7, 1935   18 Sheets-Sheet 14

Oct. 8, 1940.  J. W. BRYCE ET AL  2,217,196
CONVERTIBLE ACCOUNTING MACHINE
Filed Aug. 7, 1935   18 Sheets-Sheet 15

INVENTORS
James H. Bryce
Arthur H. Dickinson
BY
Cooper Kerr & Dunham
ATTORNEYS

Oct. 8, 1940.  J. W. BRYCE ET AL  2,217,196

CONVERTIBLE ACCOUNTING MACHINE

Filed Aug. 7, 1935   18 Sheets-Sheet 16

FIG. 10.

| FROM SOCKETS TO | M'PLYING | D'V'DING | FROM SOCKETS TO | M'PLYING | D'V'DING | FROM SOCKETS TO | M'PLYING | D'V'DING | FROM SOCKETS TO | M'PLYING | D'V'DING | FROM SOCKETS TO | M'PLYING | D'V'DING |
|---|---|---|---|---|---|---|---|---|---|---|---|---|---|---|
| | | | 72 f | 71 f | 249 a | 124 g | 123 g | 129 g | 176 h | 179 h | 197 h | 228 j | — | 309 c | 275 c | — | 88 g |
| | | | 73 f | 74 f | 250 a | 125 g | 126 g | 132 g | 177 h | — | 158 h | 229 j | — | 288 d | 276 c | — | 86 g |
| 15 a | — | 16 a / 17 a | 74 f | 73 f | — | 126 g | 125 g | — | 178 h | — | 199 h | 230 j | — | 289 d | 277 c | — | 46 f |
| 16 a | — | 15 a | 75 f | 76 f | — | 127 g | 128 g | 128 g | 179 h | 176 h | 159 h | 231 j | — | 290 d | 278 c | — | 310 f |
| 17 a | — | 15 a | 76 f | 75 f | 247 a | 128 g | 127 g | 127 g | 180 h | — | — | 232 j | — | 291 d | 279 c | — | 61 f |
| 18 f | 19 f / 20 f | 21 a / 22 a | 77 f | 78 f | 248 a | 129 g | 130 g | 124 g | 181 h | 150 h | — | 233 j | — | 292 d | 280 c | — | 59 f |
| 19 f | 18 f | — | 78 f | 77 f | — | 130 g | 129 g | — | 182 h | — | 214 h | 234 j | — | 293 d | 281 c | — | 57 f |
| 20 f | 18 f | — | 79 f | 80 f | — | 131 g | 132 g | 139 g | 183 h | 151 h | 162 h | 235 j | — | 294 d | 282 c | — | 55 f |
| 21 a | — | 18 f | 80 f | 79 f | 245 a | 132 g | 131 g | 125 g | 184 h | — | 215 h | 236 j | — | 295 d | 283 c | — | 53 f |
| 22 a | — | 18 f | 81 f | 82 f | 246 a | 133 g | 134 g | 140 g | 185 h | 152 h | 164 h | 237 j | — | 296 d | 284 c | — | 51 f |
| 23 j | 26 j | 24 d / 25 d | 82 f | 81 f | — | 134 g | 133 g | — | 186 h | — | 216 h | 238 j | — | 297 d | 285 c | — | 49 f |
| 24 d | — | 23 j | 83 g | 84 g | 112 g | 135 g | 136 g | 141 g | 187 h | 153 h | 166 h | 239 k | 240 k | — | 286 c | — | 45 f |
| 25 d | — | 23 j | 84 g | 83 g | — | 136 g | 135 g | 123 g | 188 h | — | 217 h | 240 k | 239 k | — | 287 c | — | 47 f |
| 26 j | 23 j | — | 85 g | 86 g | — | 137 g | 138 g | 142 g | 189 h | 154 h | 168 h | 241 k | 242 k | — | 288 d | — | 229 j |
| | | | 86 g | 85 g | 276 c | 138 g | 137 g | — | 190 h | — | 218 h | 242 k | 241 k | 300 e | 289 d | — | 230 j |
| 35 f | — | 261 a | 87 g | 88 g | 275 c | 139 g | — | 131 g | 191 h | 155 h | 170 h | 243 k | 244 k | — | 290 d | — | 231 j |
| 36 f | — | 262 a | 88 g | 87 g | 275 c | 140 g | — | 133 g | 192 h | — | 219 h | 244 k | 243 k | — | 291 d | — | 232 j |
| 37 f | — | 263 a | 89 g | 90 g | — | 141 g | — | 135 g | 193 h | 156 h | 172 h | 245 a | — | 80 f | 292 d | — | 233 j |
| 38 f | — | 264 a | 90 g | 89 g | 274 c | 142 g | — | 137 g | 194 h | — | 220 h | 246 a | — | 81 f | 293 d | — | 234 j |
| 39 f | 40 f | 266 a | 91 g | 92 g | — | 143 g | — | 268 c | 195 h | 157 h | 174 h | 247 a | — | 76 f | 294 d | — | 235 j |
| 40 f | 39 f | 299 e | 92 g | 91 g | 273 c | 144 g | — | 65 f | 196 h | — | 221 h | 248 a | — | 77 f | 295 d | — | 236 j |
| 41 f | 42 f | 265 a | 93 g | 94 g | — | 145 g | — | 148 g | 197 h | 158 h | 176 h | 249 a | — | 72 f | 296 d | — | 237 j |
| 42 f | 41 f | 298 e | 94 g | 93 g | 272 c | 146 g | — | 64 f | 198 h | — | 222 h | 250 a | — | 73 f | 297 d | — | 238 j |
| 43 f | — | 44 f | 95 g | 96 g | — | 147 g | 148 g | — | 199 h | 159 h | 178 h | 251 a | — | 68 f | 298 e | — | 42 f |
| 44 f | — | 43 f | 96 g | 95 g | 271 c | 148 g | 147 g | 145 g | 200 h | — | 223 h | 252 a | — | 69 f | 299 e | — | 40 f |
| 45 f | 46 f | 286 c | 97 g | 98 g | — | 149 h | 163 h | — | 201 h | 207 h | 203 h | 253 a | — | 110 g | 300 e | — | 242 k |
| 46 f | 45 f | 277 c | 98 g | 97 g | 270 c | 150 h | 181 h | 161 h | 202 h | 206 h | 204 h | 254 a | — | 121 g | 301 e | — | 302 e |
| 47 f | 48 f | 287 c | 99 g | 100 g | — | 151 h | 183 h | 163 h | 203 h | — | 201 h | 255 a | — | 108 g | 302 e | — | 301 e |
| 48 f | 47 f | — | 100 g | 99 g | — | 152 h | 185 h | 165 h | 204 h | — | 202 h | 256 a | — | 119 g | 303 e | — | 304 e |
| 49 f | 50 f | 285 c | 101 g | 102 g | — | 153 h | 187 h | 167 h | 205 h | — | 207 h | 257 a | — | 106 g | 304 e | — | 303 e |
| 50 f | 49 f | — | 102 g | 101 g | 269 c | 154 h | 189 h | 169 h | 206 h | 202 h | — | 258 a | — | 117 g | 305 c | — | 224 j |
| 51 f | 52 f | 284 c | 103 g | 104 g | — | 155 h | 191 h | 171 h | 207 h | 201 h | 205 h | 259 a | — | 104 g | 306 c | — | 225 j |
| 52 f | 51 f | — | 104 g | 103 g | 259 a | 156 h | 193 h | 173 h | 208 h | 209 h | 211 h | 260 a | — | 115 g | 307 c | — | 226 j |
| 53 f | 54 f | 283 c | 105 g | 106 g | — | 157 h | 195 h | 175 h | 209 h | 208 h | 213 h | 261 a | — | 35 f | 308 c | — | 227 j |
| 54 f | 53 f | — | 106 g | 105 g | 257 g | 158 h | 197 h | 177 h | 210 h | — | 212 h | 262 a | — | 36 f | 309 c | — | 228 j |
| 55 f | 56 f | 282 c | 107 g | 108 g | — | 159 h | 199 h | 179 h | 211 h | — | 208 h | 263 a | — | 37 f | 310 f | 311 f | 278 c |
| 56 f | 55 f | — | 108 g | 107 g | 255 g | 160 h | — | 312 h | 212 h | — | 210 h | 264 a | — | 38 f | 311 f | 310 f | — |
| 57 f | 58 f | 281 c | 109 g | 110 g | — | 161 h | — | 150 h | 213 h | — | 209 h | 265 a | — | 41 f | 312 h | — | 160 h |
| 58 f | 57 f | — | 110 g | 109 g | 253 a | 162 h | — | 183 h | 214 h | — | 192 h | 266 a | — | 39 f | 313 f | — | 318 f |
| 59 f | 60 f | 280 c | 111 g | 112 g | — | 163 h | 149 h | 151 h | 215 h | — | 184 h | 267 c | — | 114 g | 314 f | 318 f | 319 f |
| 60 f | 59 f | — | 112 g | 111 g | 83 g | 164 h | 167 h | 185 h | 216 h | — | 186 h | 268 c | — | 143 g | 315 f | 319 f | 320 f |
| 61 f | 62 f | 279 c | 113 g | 114 g | — | 165 h | — | 152 h | 217 h | — | 188 h | 269 c | — | 102 g | 316 f | 320 f | 321 f |
| 62 f | 61 f | — | 114 g | 113 g | 267 c | 166 h | — | 187 h | 218 h | — | 190 h | 270 c | — | 98 g | 317 f | 321 f | — |
| 63 f | 64 f | — | 115 g | 116 g | 260 a | 167 h | 164 h | 153 h | 219 h | — | 192 h | 271 c | — | 96 g | 318 f | 314 f | 313 f |
| 64 f | 63 f | 146 g | 116 g | 115 g | — | 168 h | 171 h | 189 h | 220 h | — | 194 h | 272 c | — | 94 g | 319 f | 315 f | 314 f |
| 65 f | 66 f | 144 g | 117 g | 118 g | 258 a | 169 h | — | 154 h | 221 h | — | 196 h | 273 c | — | 92 g | 320 f | 316 f | 315 f |
| 66 f | 65 f | — | 118 g | 117 g | — | 170 h | — | 191 h | 222 h | — | 198 h | 274 c | — | 90 g | 321 f | 317 f | 316 f |
| 67 f | 68 f | — | 119 g | 120 g | 256 a | 171 h | 168 h | 155 h | 223 h | — | 200 h | | | | | | |
| 68 f | 67 f | 251 a | 120 g | 119 g | — | 172 h | 175 h | 193 h | 224 j | — | 305 c | | | | | | |
| 69 f | 70 f | 252 a | 121 g | 122 g | 254 a | 173 h | — | 156 h | 225 j | — | 306 c | | | | | | |
| 70 f | 69 f | — | 122 g | 121 g | — | 174 h | — | 195 h | 226 j | — | 307 c | | | | | | |
| 71 f | 72 f | — | 123 g | 124 g | 136 g | 175 h | 172 h | 157 h | 227 j | — | 308 c | | | | | | |

INVENTORS
James W. Bryce
Arthur H. Dickinson
BY Cooper, Kerr & Dunham
ATTORNEYS

FIG.12.

Patented Oct. 8, 1940

2,217,196

UNITED STATES PATENT OFFICE 2,217,196

CONVERTIBLE ACCOUNTING MACHINE

James W. Bryce, Bloomfield, N. J., and Arthur H. Dickinson, New York, N. Y., assignors to International Business Machines Corporation, New York, N. Y., a corporation of New York Application August 7, 1935, Serial No. 35,072

4 Claims. (Cl. 235—61.6)

This invention relates to a record controlled calculating machine capable of performing multiplication as well as division. While machines capable of such conjoint use have been previously devised, prior machines were comparatively slow in their operation and complicated in construction. In certain previous machines calculating sections were provided including portions which were wholly utilized for division and other portions which were wholly utilized for multiplication and such prior machines were provided with a common card analyzing section for separately controlling the division and multiplying calculating sections of the machine.

One object of the present invention resides in the provision of a calculating machine of such a construction that common calculating means and devices may be utilized either for multiplication or division, thereby simplifying the construction of the machine and materially reducing the mechanism required in the calculating section of the machine.

A further object of the present invention resides in the provision of novel and simple means for re-connecting and interrelating parts of the mechanism in one way or another according to whether the machine is to be used for division or multiplication.

A further object of the present invention resides in the provision of means to enable a machine to be changed by a single simple operation from a status in which it is capable of multiplying to a status in which it is capable of effecting division or vice versa, whereby setup time is minimized and whereby the use of numerous complicated variably settable controlling elements is obviated.

Further and more general objects of the present invention reside in the provision of a combined machine capable of effecting either multiplication or division in which comparatively high speed of operation may be secured under either kind of calculating operation with comparatively simple mechanism.

A further object of the present invention resides in the provision of a novel arrangement of a multiplying machine which effects multiplication by the addition of preformed sub-products, said sub-products being based upon an entered factor and in which a lesser number of sub-product setting up and forming devices are employed than heretofore.

A further object of the present invention resides in the provision of a combined machine adapted for multiplication or division and with cooperatively insertable plug board devices for both controlling the sequence of the machine operations and functions according to the kind of problem to be performed and for also providing for variable selectivity of original entries and readout relations.

Previous accounting machines for effecting multiplication and/or division, particularly those of the electro-mechanical type, comprised a great multiplicity of switches which had to be selectively pre-set by the operator according to the functions which certain sections of the machine had to perform, and such prior machines also included a great multiplicity of flexible plug connections which had to be individually put in place by the operator. Such switch positioning and plug inserting operations are time consuming and required considerable skill and knowledge of the machine by the operator. Accordingly, one of the objects of the present invention is to provide an improved construction wherein such switches and individually insertable plug connections do not have to be manipulated at the machine by the operator but wherein the operator may by a single simple operation, set up the machine for a given calculation, say for multiplication and then by another single simple operation change the machine so that it may effect another calculation, say division. More particularly it is an object of the present invention to effect such machine changes by the utilization of insertable electrical units which may be inserted and removed from the machine as a unit. Such units may be pre-wired or pre-connected in advance by another operator and one setup may be kept ready for use in cooperation with the machine when required.

A further object of the present invention resides in the provision of a calculating machine of the electro-mechanical type wherein by a mere change of circuit connections adapted to be made expeditiously by the operator the machine can be changed from a status in which it is capable of multiplication to a status in which it is capable of division or vice versa.

Heretofore record controlled and record making accounting machines have been devised adapted to derive the factors of a computation from a record and to then multiply the factors and to record the product upon the record. Other record controlled and record making accounting machines have been devised to perform division computations in which the dividend and divisor data are derived from a record and in which quotient results, remainders, etc., are recorded upon the record.

Combined machines have also been provided adapted to perform both multiplication and division by over and over addition and over and over subtraction methods respectively. Machines of this latter class are, however, complicated in construction and comprise independent units which are separately used in the different types of computation. Such machines also require a great multiplicity of switch positioning and plugging operations upon the part of the operator for re-conditioning the machine for effecting a dividing computation or a multiplying computation or to change back from a condition in which one type of computation may be performed to the other.

According to the present invention a machine is provided which comprises broadly an analyzing or card sensing section and a result recording section. Both of the foregoing sections are utilized in dividing and multiplying computations. Intermediate the foregoing sections is a calculating section which for multiplying calculations includes two amount receiving devices, each having associated therewith readout means. Upon these readout means the following multiples of an entered multiplicand may be set up. On the readout means of one amount receiving device the multiplicand times one and the multiplicand times 5 is set up. On the readout device associated with another amount receiving means the multiplicand times 2 and the multiplicand times 4 is set up. The set up of the multiplicand times 2 is effected by adding to an originally entered multiplicand amount another multiplicand amount derived from the MC times 1 readout. An amount receiving device is also provided for the multiplier factor and a result receiving device is provided for receiving the product. After preliminary operations in which the aforesaid various multiples of the entered multiplicand are automatically set up upon the readout devices, the pre-created and pre-set sub-products are entered into the result receiving device in accordance with the digit value of the multiplier in the corresponding multiplier receiving device.

When it is desired to utilize the foregoing machine for dividing calculations, use is made of the calculating section of the machine which was formerly used for multiplication. All amount receiving devices of this calculating section are utilized in dividing calculations except the multiplier amount receiving device. In dividing calculations one of the amount receiving devices, which in multiplication receives a multiplicand amount, is utilized for receiving the divisor amount. Use is made of the product or result receiving device for receiving the dividend entry and such device is also utilized for receiving the quotient amount as the same is created by the calculating operation of the machine. One of the other amount receiving devices which upon multiplying computations was utilized for setting up the times 2 and times 4 multiples of the entered multiplicand is used for receiving a set up of $\frac{1}{10}$ of the divisor amount. Such $\frac{1}{10}$ divisor factor is utilized upon dividing calculations for the operation of reintroducing the divisor and for subtracting the divisor in a shifted over columnar relation in the event that the remainder goes back of zero during dividing calculating operations by successive subtraction. As stated before, upon dividing calculations the multiplier receiving device is idle and is not utilized. Upon division, calculation is effected by successively diminishing the dividend amount by the divisor amount and by re-introducing the $\frac{1}{10}$ divisor factor upon the remainder going back of zero. In order to set up the $\frac{1}{10}$ divisor factor, use is made of the one of the readout devices from which the multiplicand times 1 is read out upon multiplying computations. Associated circuit controlling means are provided to adapt the readout from which the amount of the multiplicand times one is read out upon multiplication so that either the divisor itself or the true complement thereof may be read out therefrom. Accordingly, upon division, an inverter readout is available for use in controlling subtraction operations and a direct readout is also available.

In order to convert the machine from a dividing machine to a multiplying machine or vice versa, use is made of circuit controlling means preferably in the form of insertable plug board elements which are inter-changeable according to the type of calculation to be performed by the machine. By the use of such insertable, changeable and inter-changeable means, the operator, by a single operation and by an operation which can be effected expeditiously and which requires no particular skill or dexterity or great familiarity with the machine, is enabled to change it from a status in which it is capable of performing multiplication to a status in which it is capable of performing division or vice versa. By utilizing changeable circuit controlling means or elements of the foregoing unitary type the necessity of manipulation of a great number of switches and the necessity of the selective disposition by the operator of a great number of plug connections is obviated. In this way the over-all speed of machine operation is increased and the time required to change the machine from a dividing to a multiplying machine or vice versa is materially reduced.

It will be further understood that the cyclic sequence of operations of various devices and parts of the machine must be changed in modifying the machine from a dividing to a multiplying machine or vice versa. Such operations are controlled by sequence control means and other devices and such sequence control means and devices are also under the control of the unitary changeable circuit controllers. Furthermore, the entry relations and the readout relations for result recording may vary according to the particular problem being computed either in multiplication or division and such entry and readout relations may be controlled in a unitary manner by changeable circuit controllers. Such changeable circuit controllers for entries and result recording may be unitary with the function and sequence control circuit controller or separate or independent therefrom as desired.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1a, 1b, 1c, 1d, 1e, 1f, 1g, 1h, 1j and 1k, taken together, show the circuit diagram of the complete machine. The figures are arranged as indicated in Fig. 2, that is Figs. 1a, 1b, 1c, 1d, and 1e are arranged vertically in the order named. These figures show the devices which are principally used in the machine upon dividing operations. To the right of these figures are placed vertically in the order named as shown in Fig. 2, Figs. 1f, 1g, 1h, 1k and 1j. These figures show the circuit diagram for the parts of the machine principally used for multiplication. Certain parts shown on this portion of the diagram are also used during dividing calculations.

Fig. 2 is an explanatory view showing the manner in which the circuit diagram of figures is arranged;

Fig. 3 is an enlarged view showing the manner in which one of the readout devices of the machine is plugged up for multiplying calculations;

Fig. 4 is a view of the same readout device showing the manner in which it is plugged up for dividing calculations;

Figure 5A:
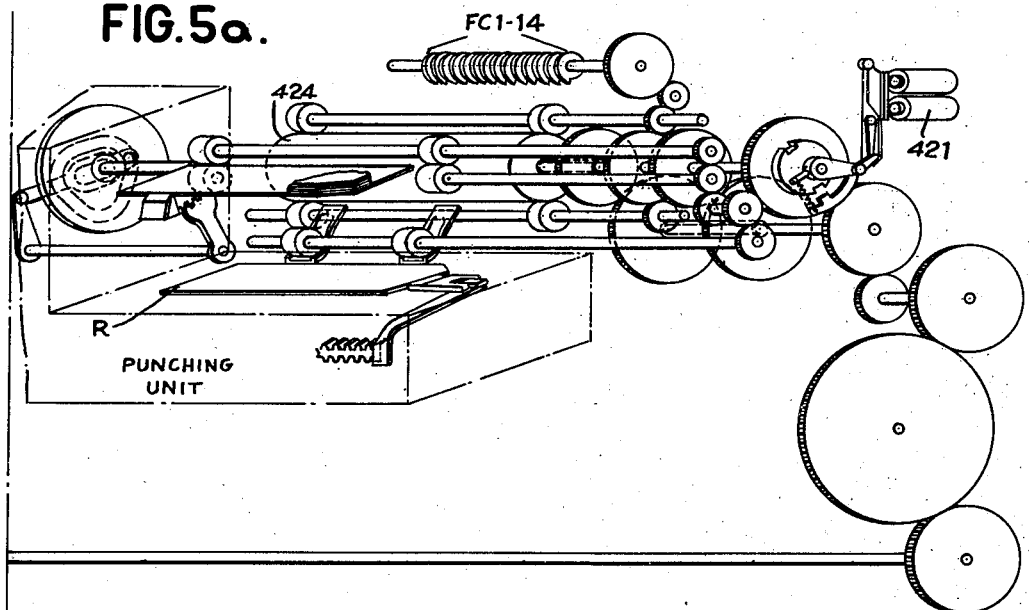
Figure 6:
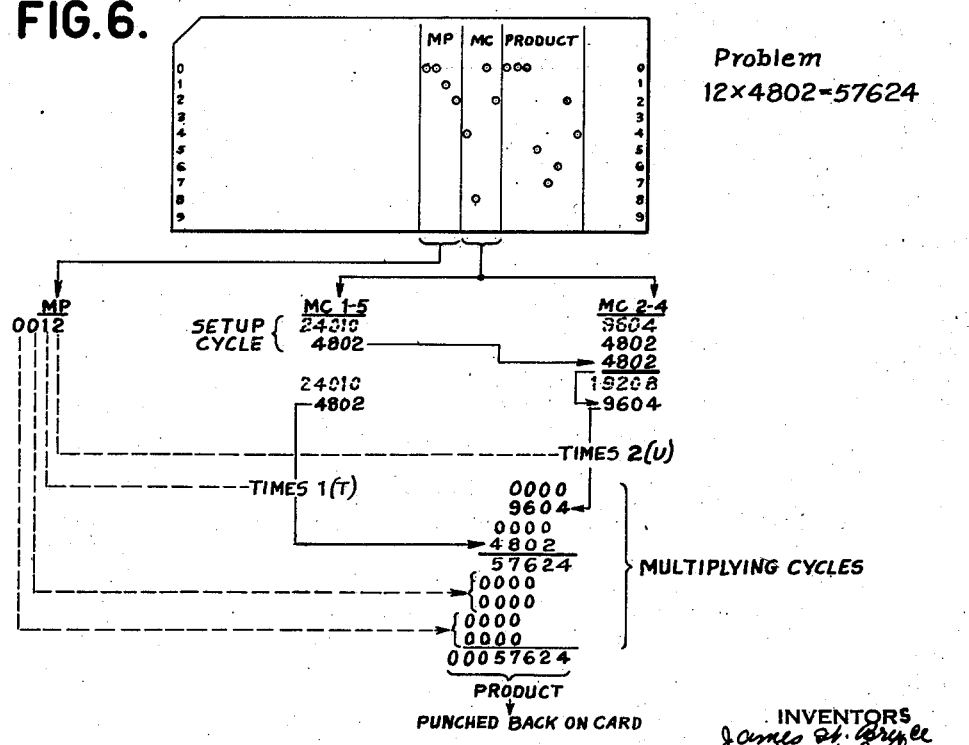
Figure 7:
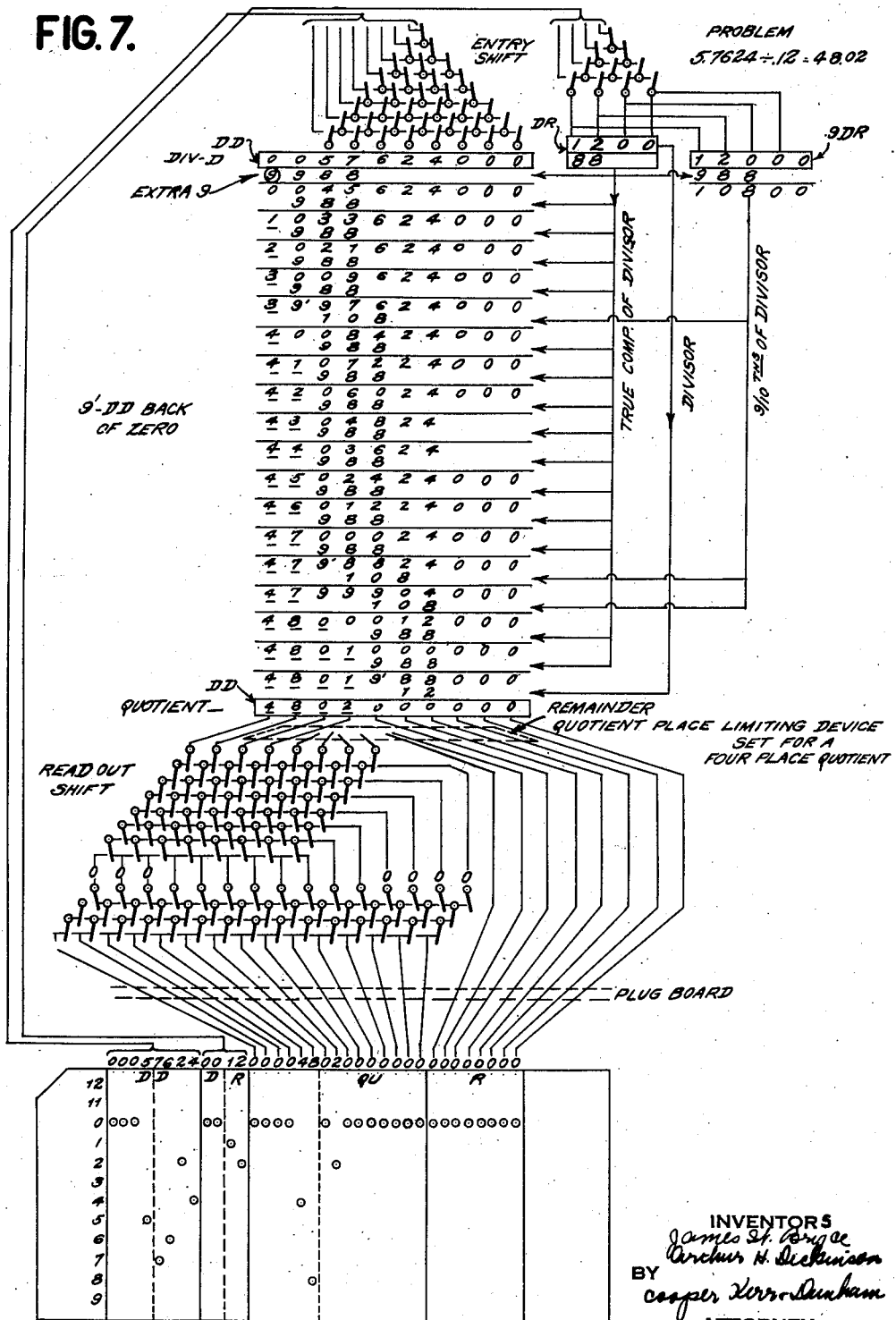
Figure 8:
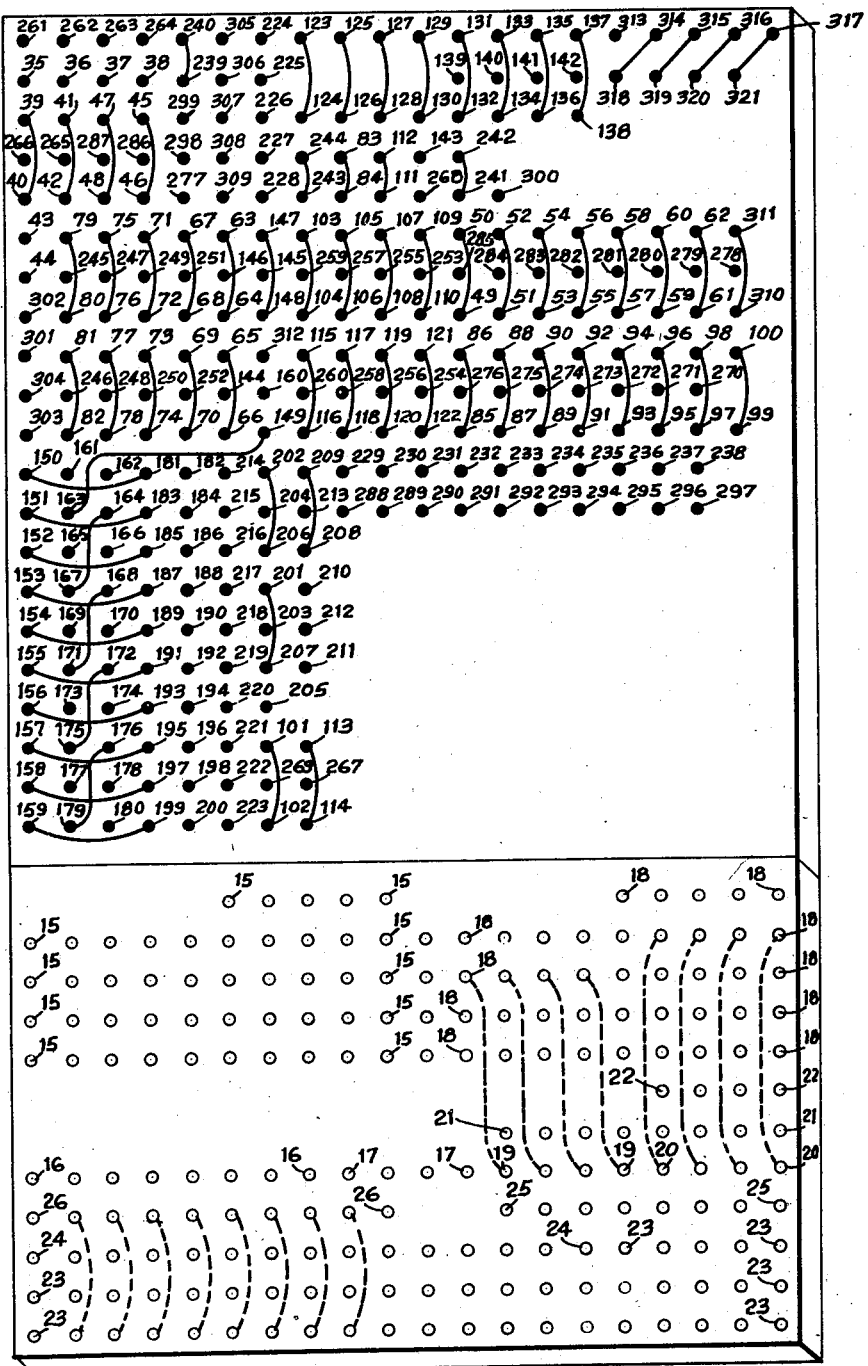
Figure 9:
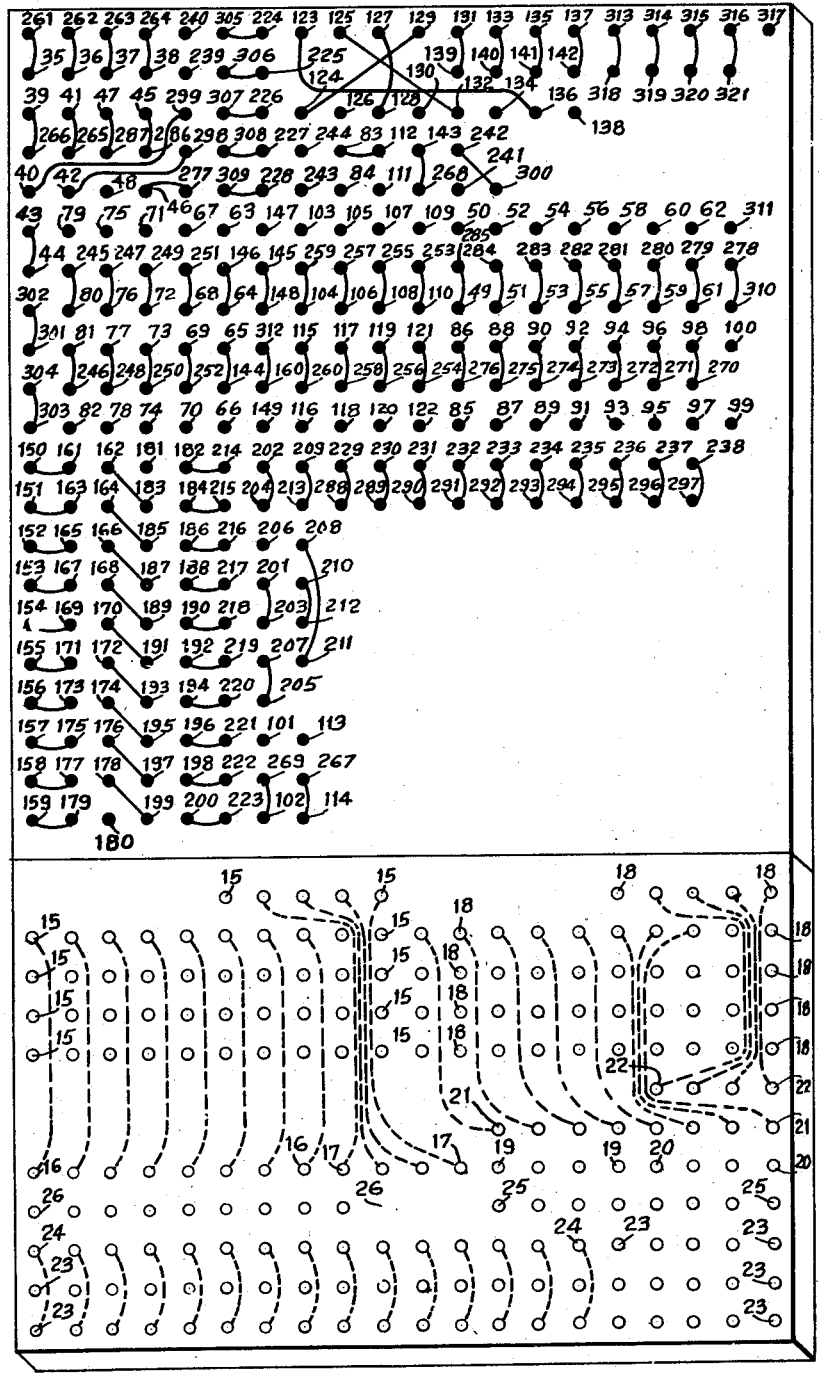

Such Figs. 3 and 4 are respectively enlarged views of a readout device shown elsewhere on the circuit diagram;

Figs. 5 and 5a taken together show somewhat diagrammatically the driving mechanism in the machine and the various sections thereof;

Fig. 5b is a detail cross-sectional view showing the card handling and sensing section of the machine;

Fig. 6 shows diagrammatically the manner in which an amount flows through the machine on multiplying calculations;

Fig. 7 is a similar diagrammatic view showing the flow of entries and amounts on a dividing calculation;

Fig. 8 shows one of the insertable plug board units, wired up for controlling the machine for multiplying calculations;

Fig. 9 is a similar view of one of these units wired up for dividing calculations;

Fig. 10 is a table showing the manner in which electrical connections are made in the insertable plug board units for dividing and multiplying calculations. The figures on this table correspond to similarly numbered sockets on the circuit diagram of the machine and alphabetical characters following the numerals indicate the corresponding figure of the circuit diagram drawings upon which the particular socket will be found. For example, if the numeral 15 followed by a appears on the plug board table, this will indicate that the plug socket 15 appears on Fig. 1a of the drawings.

Figure 12:
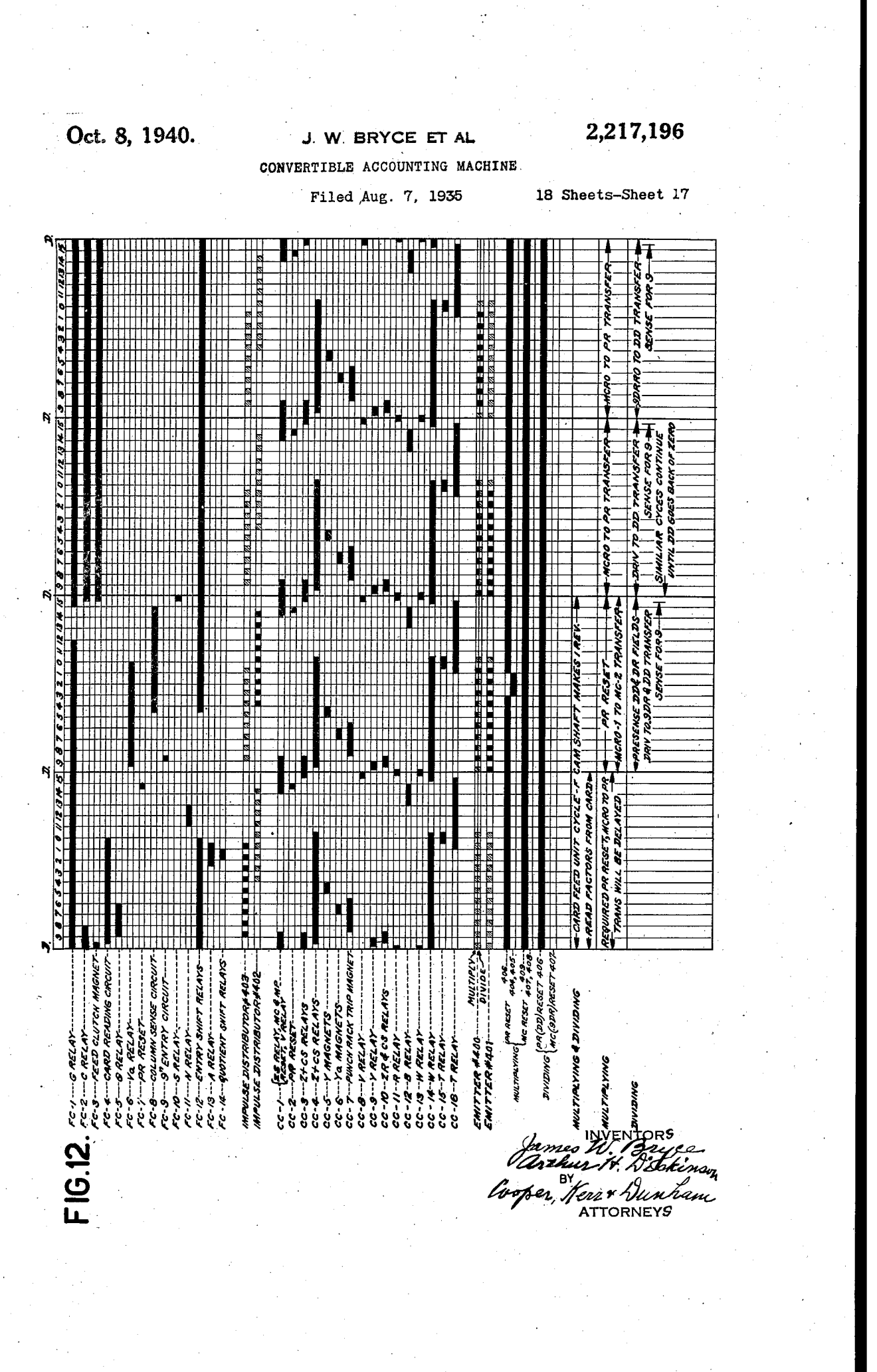
Figure 12A:
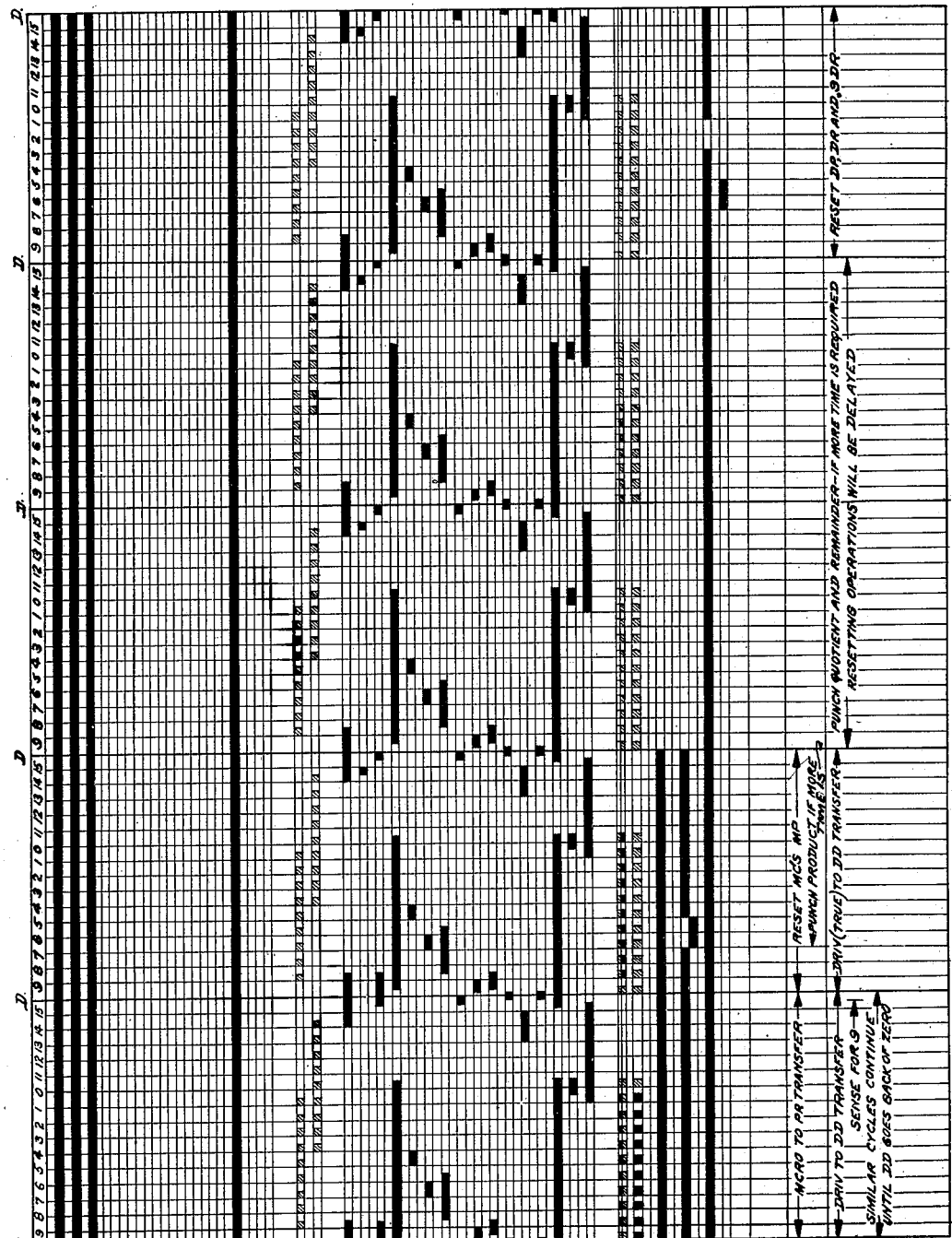

Fig. 11 shows a partial end view partly in section of the automatic plug board section of the machine. Figs. 12 and 12a, taken together with Fig. 12a to the right of Fig. 12, show the timing diagram of the machine.

The accounting machine, to which the present invention is shown as applied so far as most of the units and the mode of drive therefor, is substantially the same as the machine shown and described in the United States Patents to Cunningham, No. 1,933,714 and Oldenboom, No. 1,944,665, to which reference may be had for fuller description of the general operation of the various units and the manner of drive. In lieu of providing a direct drive for the contact roll a creeping drive is provided, the same as that shown and described in United States application of George F. Daly, Serial No. 643,663, filed November 12, 1932. The creeping drive includes the usual supplemental gearing for driving the contact roll with a creeping movement. Such creeping drive is also shown in United States Patent No. 1,944,665.

The machine includes receiving devices as follows. An entry receiving device for the multiplier is provided indicated at MP (Fig. 5). A result receiving device for product amounts is provided which is labelled "PR". This same device on dividing calculations is utilized for division and it is accordingly designated in brackets DD. On division, such device receives the dividend and it also receives the quotient as the same is created. For receiving the multiplicand and multiples of such multiplicand, two entry receiving devices are provided. These are of accumulator form and are designated MC—1 and MC—2. Upon dividing calculations, these same devices are also utilized. The MC—1 device is utilized for receiving the divisor. Such device is accordingly also labelled (DR). It may be explained that this entry receiving device also has an inverting readout section which is utilized on division calculations. The other entry receiving device, viz. that which on multiplying computations receives an amount of twice the multiplicand is utilized on division calculations for receiving a set up of $\frac{1}{10}$ of the divisor. It is accordingly labelled in brackets .9DR. These various entry receiving devices are in the form of accumulators and are driven in the same manner as correspondingly located accumulator units in the Cunningham patent above referred to.

In lieu of providing electro-mechanical column shift and control relays as heretofore provided in machines of this class in the present machine, purely electrical multi-contact relays are provided.

It may be explained that the MC—1 entry receiving device in addition to being provided with the usual readout section is providing with a supplemental or times 5 readout section for reading out therefrom five times the amount of the entry set up therein. Such readout section is designated MCRO—5 on Fig. 5. Likewise the MC—2 receiving device in addition to having the usual readout section is provided with a doubling readout section which is designated MCRO—4.

The machine also includes two impulse emitters 400 and 401, (Fig. 5) which are driven in the indicated manner.

In the present machine there are fourteen FC cam contact devices designated FC 1—14 inclusive on Fig. 5a. The machine also includes cam contacts CC 1—16 (Fig. 5) which are driven from the counter drive shaft in the indicated manner. The machine also includes two impulse distributors 402 and 403 (Fig. 5). The PR (DD) accumulator resetting device controls two sets of contacts, one set designated 404 comprises a pair of contacts wihch are adapted to be closed upon reset and the other set being a three-blade contact arrangement involving two pairs of contacts 405 and 406. Contacts 405 close upon reset and contacts 406 open upon reset. The MC—2 receiving device reset mechanism controls two sets of contacts, one set includes a pair of contacts 407 which are adapted to be closed on reset and the other set is a three-blade contact arrangement involving a pair of contacts 408 which close on reset and a pair of contacts 409 which open upon reset.

Referring to Fig. 5b, the card handling and sensing section of the machine is generally the same as in the Cunningham patent. The main readout or sensing brushes are shown and designated 410. Advance sensing brushes are also shown and designated 411. There are also shown card lever contacts 412.

Complete details of the punch are not shown herein as they are substantially the same as the punch described in the foregoing patents. A portion of the punch is shown in Fig. 5a in proximity to the card in the entering section of the punch.

Readouts

The readouts associated with the various entry receiving and product accumulator devices are generally similar to those previously used in the art with the exception of the readouts which are associated with the MC—1 and MC—2 entry receiving devices. All of these readouts have one section for reading out directly the amount standing in the related entry receiving device. In the MC—2 receiving device this section is of dual character and it cooperates with the MCRO—4 section so that the direct amount as well as double the amount may be read out. Associated with the MC—2 entry receiving device is an MCRO—2 readout shown on Fig. 1h of the circuit diagram. Driven from this readout is another readout designated MCRO—4. Both the MCRO—2 and MCRO—4 readouts are of the so-called dual type. The MCRO—2 readout has one section which is wired for the direct readout of the amount of twice the multiplicand standing in the MC—2 accumulator. The MCRO—4 readout is so wired to the emitter 400 that any readout therefrom will be double that of the brush position. For example, if the units brush of the MCRO—4 readout is standing on the 4 spot, by tracing the wiring to the emitter 400 it will be noted that there will be an actual read out of 8 which is twice 4 in the units place. However, when double the amounts are to be read out within the range from the 5 to the 9 positions, the readout from the next higher order column must be increased by one, that is, if there is an entry of 18 in MC—2, the actual amount read out from MCRO—4 must be 36, the tens column reading $(2 \times 1) + 1 = 3$. This is provided for by extending the readout circuits from the tens, hundreds and higher order columns of the MCRO—4 readout to an extra section of the MCRO—2 readout. Wiring 468 and 469 is provided for this purpose. It will be noted that the wiring 468 extends to spots 0 to 4 inclusive of such section of the MCRO—2 readout and that wiring 469 extends to spots 5 to 9 inclusive on the extra section of the MCRO—2 readout. Accordingly, one section of the MCRO—2 readout pilots the reading to be derived from MCRO—4 increasing the read out therefrom by one in the next higher order column when required.

The special arrangement of wiring from the emitter 400 to the MCRO—4 readout provides for the required doubled amount to be read out. As stated before, the other section of the MCRO—2 readout is utilized for a direct or straight readout of the amount standing in the related entry receiving device. It will be self-evident that the MCRO—4 readout is driven from MCRO—2 readout by intermediate gearing in a well known manner. United States Patent No. 2,405,437 shows a readout with intermediate gearing in Fig. 16. It will be understood, however, that the superimposed readout is of the customary dual type usually used on MC readouts, that is to say, there are two brushes driven by a single denominational setting order device.

The mode of operation of this doubling readout structure can be best understood by considering two typical examples. Assume the number 18 is entered into MC—2. When 18 is doubled the result is 36, which means that the tens order must be augmented by 1 in doubling the 1 in the units order. With 18 entered in MC—2, the units order brushes in MCRO—2 and MCRO—4 will stand on the 8 spot and the tens order brushes on the 1 spot. Now tracing the circuit from the 6 spot of emitter 400, the 6 wire of the 425 group will be found to extend to and be connected to the 8 units spot on MCRO—4 and the circuit will be established through the right hand units order brush, out via the common segment through the wire shown, down through the 4Z—5 relay contact and through the uppermost wire of the 438 group, through a column shift relay contact now closed to a 423PR accumulator magnet. In this way 6 is entered in an order of such accumulator. Now considering the tens order from the 3 spot of emitter 400, the third wire of the group 425 extends to the one segment spot in the tens order of MCRO—4. Circuit relations are established via the right hand tens order brush to the collector ring and thence out via the right hand of the 469 wires, down through the right hand units order brush of MCRO—2 now standing at 8 in the control section, thence through the right hand units order brush, out via the collector ring through the 5Z—4 relay contacts, via the second from the top wire of group 438, through a column shift relay contact to an accumulater magnet 423PR. This enters a 3 into such accumulator in the proper order, which order is one to the left of the order receiving the 6. If a brush standing at 5 in the units order of MC—2, the right hand and left hand units order brushes of MCRO—2, will also stand on 5. Likewise the right and left hand units order brushes of MCRO—4 will stand on 5. Tracing the circuit from emitter 400, a circuit will be completed from the 1 spot of the emitter, through a wire of the 425 group, over to the right hand tens order brush of MCRO—4 now standing on zero, down through the common segment, out through the right hand wire of group 469, down to and through the right hand units order brush of MCRO—2 now standing on 5, through the common collector ring, through the 4Z—4 relay contact and down to the second from the top of the 438 set of wires, through the column shift contact to a 425PR counter magnet in proper columnar order. Referring now to the MCRO—1 and MCRO—5 readouts, the MC—1 entry device has a customary dual readout associated therewith. On the circuit diagram (Fig. 1h) one section of the dual readout labelled "MCRO—1" is provided for direct readout of the amount standing on the MC—1 entry receiving device. The other section of the MCRO—1 readout comprises a piloting section for the MCRO—5 readout. The special wiring for reading out five times the amount of the entry in the MC—1 device will now be described with reference to Fig. 1h of the circuit diagram. In this figure the piloting section is associated with the direct readout section of MCRO—1. If an amount in a units order of the MC—1 entry receiving device stands on an odd number, for example a 5 spot, the five times multiple of that amount in the units column will always be a 5. There will or may be, of course, a carry increment in addition. On the other hand, if the amount in the units order of MC—1 were an even amount, the even amount multiplied by 5 would always be zero. This principle is utilized in the construction of the readout. It will be noted that the odd number spots of the piloting section in the units order of the MCRO—1 readout (see Fig. 3) are connected together by plug connections in the insertable plug board and that such plug wiring extends up to a socket 169, which in turn extends via line 470, which is is connected to the 5 spot of emitter 400. Accordingly if an entry were either 1, 3, 5, 7, or 9 in the units column, a 5 representing impulse would flow out to the outgoing line 471 from the piloting section because of the position of the brush in the piloting section.

The construction of the readout may be best understood by considering typical problems. Suppose 65 is set up in the MC—1 entry receiving device. In this event the units order setting will be odd and the tens order setting will be even. The direct tens order component will therefore be zero but this must be supplemented by the carry increment component from the units order. Such carry component for a setting of 5 in the units order will be 2 so that 2 will be read out from the tens order providing the tens order be even. On the other hand, if the tens order setting were odd, for example, for an MC—1 entry of 75, the readout from the tens order must be an amount of 5 which would be the direct amount in the tens order, but such amount of 5 must be increased by the carry increment from the units order. This carry increment is 2 and therefore the readout from the tens order should be 7. This readout structure may best be understood by tracing the wiring for a readout of 5x65 and for a readout of 5x75. If 5x65 is to be readout, the brush setting in the piloting section will be on 5 in the units column. With the emitter 400 in operation, an emission of a 5 impulse will flow over the line 470, thence through the plug connections between socket 169 (Fig. 3), 163, 164 to 167, 168 to 171, through the left hand units order brush of MCRO—1, which is the piloting section brush, down through the common segment, through a plug connection between socket 202 and 206 to the wire 471 and to the proper entry receiving device or accumulator. The piloting brush in the tens order will be standing on the 6 or an even spot. Such spots, as shown, are connected to a wire such as 472 which leads up to a common strip in the other readout section. With the units order brush of this MCRO—5 readout also standing on a 5 spot, by tracing the wiring to the emitter 400, it will be seen that a circuit will be completed from the 2 spot of the emitter to the brush on the 5 spot in the units column of one section of MCRO—5, then down through the wire 472, and out through a wire 473, which leads to an entry receiving device so that 2 will be entered therein in the tens order. The entry, however, is not complete, there being an additional entry to be made of 3 in the hundreds order. A brush in the piloting section related to the hundreds order will be standing on zero or an even spot. Accordingly, a circuit will be completed from the 3 spot of the emitter 400, throught the "3" wire of the 425 group and the associated transverse buses to the brush in the tens order of MCRO—5, which is standing on the 6 spot and out via wire 474, through the piloting section and then out via wire 475 which leads to an entry receiving device to enter a 3 therein in the hundreds order. It may be explained that the proper carry increment is provided by the wiring to the emitter 400 and also by the piloting arrangement.

The principle of operation on which the times five readout works may be set forth as follows. If the amount in the particular column is odd, the multiple readout in that column will be an amount of 5 increased by the carry increment (if any) from the next lower order. If the amount standing in a particular order is even the multiple amount to be read out will be zero plus the carry increment (if any) from the next lower order. The piloting section in effect determines whether the setting is odd or even and controls selectively the readout from the upper section in accordance with such odd or even setting. The actual readout is from the upper section and on the upper section a readout can be made irrespective of whether odd or even amounts are set up therein. The lower section in MCRO—1 pilots the reading to be read out from the upper section of MCRO—5 according to whether amounts are odd or even in particular columns. If 75 were standing in the MC—1 device, the readout of 5 in the units column would be the same as before. The tens order brush of the piloting section is standing on 7, which is an odd amount. The odd piloting circuit is now via wire 476 to the upper section. The upper section units brush is standing on 5, but the wiring connection to the emitter is such that 7 will be read out from the emitter. The 3 in the hundreds order is read out in a similar manner as previously explained.

The MCRO—5 and MCRO—4 readout sections are not utilized at all upon dividing computations. However, the MCRO—1 readout section is utilized. Inasmuch as upon dividing operations provision must be made for reading out not only the direct amount but an inverted amount, viz. the true complement of the amount standing on MC—1, that is, the DR entry device on dividing, use is made of the straight readout section of DR in all columns except the units column, and inasmuch as inverted readout is required a dual readout section is required. Accordingly, the heretofore used piloting section in the units order which was used for piloting upon multiplication is utilized as the supplementary readout section in the units order for division. Such supplementary section is brought into cooperation by means of the plugs of the insertable plug board and by a relay control. Fig. 3 of the drawing shows the connections of the readout, particularly with regard to the units order column thereof when the readout is to be utilized for multiplication and Fig. 4 shows the wiring connections of this portion of the readout when the latter is to be utilized for division and when an inverted readout as well as a straight readout is required.

When the machine is used for dividing computations with regards to the MCRO—2 readout only the straight readout section of that readout is utilized. The supplemental piloting section of this readout which is utilized on multiplication for piloting the reading to be derived from MCRO—4 is not used.

*Operation*

Before describing the circuit diagram of the machine the general mode of operation of the machine for effecting multiplication will be briefly described. On multiplication it will be assumed that the present machine is intended to handle multiplier and multiplicand entries of a maximum of four columns each. Obviously, the machine may have a greater capacity. Upon a card entering the sensing section of the machine the sensing brushes 410 sense the multiplier and multiplicand fields of the card and enter the multiplier into the MP receiving device. On the reading of the card the multiplicand is entered into MC—1 and MC—2. As explained before, the MC—1 accumulator or receiving device has a regular readout section designated MCRO—1 on the circuit diagram with a section from which the amount of the multiplicand may be read out. Upon the following cycle after the entry of the multiplicand from the card, the amount of the multiplicand is read out from MCRO—1 and entered into MC—2. There is accordingly set up in MCRO—2, twice the amount of the multiplicand. The MC—1 receiving device in addition to being provided with an MCRO—1 readout is provided with a times five readout designated MCRO—5. The MC—2 entry receiving device is provided with a doubling readout designated MCRO—4. Accordingly, after the foregoing entry and supplemental cycle there is the possibility of reading out from the various readout devices the amount MC×1, an amount of MC×5, the amount of MC×2 and the amount of MC×4.

The machine is now ready to effect multiplication, which operation is effected by the reading out of a multiple or multiples of the multiplicand or complete sub-products from a selected readout section or sections with an entry of such multiple multiplicand amount or amounts into the product accumulator. This operation is effected under the control of the MP entry device which is set according to the amount of the multiplier.

To illustrate, if the multiplication is to be by 6, the machine would read out the four times multiple of the entered multiplicand from MCRO—4 and enter this amount into the products accumulator and then subsequently would read out from MCRO—2 readout twice the amount of the entered multiplicand and enter such amount into the products accumulator. It may be explained that the sequence of multiple entries is not necessarily maintained in the same order for different multiplying operations. In certain cases the machine might enter twice the multiplicand first and thereafter enter four times the multiplicand into the products accumulator. The following table will show the manner of combining entries for different multiplier values.

| MP | MC |
|---|---|
| 1 | MC×1 |
| 2 | MC×2 |
| 3 | MC×1+MC×2 |
| 4 | MC×4 |
| 5 | MC×5 |
| 6 | MC×2+MC×4 |
| 7 | MC×5+MC×2 |
| 8 | MC×4+MC×4 |
| 9 | MC×5+MC×4 |

It may be explained that with the present machine for simplification of construction no cycle controller is provided and that the machine operates with a fixed number of cycles on multiplying. Cycles are not eliminated for zero columns in the multiplier and two entering cycles into the products receiving device are provided irrespective of whether or not two actual entries are required to be made.

The foregoing generally explains the manner in which multiplying operations are effected by the machine.

On dividing calculations the general operation is as follows. Upon reading of the card, the amount of the dividend is introduced into the DD accumulator. The amount of the divisor is introduced into the DR entry receiving device and such divisor amount is also introduced into the .9 DR receiving device. On the counter cycle following the entry cycle from the card there is a readout of the true complement of the divisor from the inverting readout section of the DR receiving device and an entry of such complemental divisor into the .9 DR entry receiving device. This operation sets up in the .9 DR device an amount which is equal to $\frac{1}{10}$ of the divisor. The entry into the $\frac{1}{10}$ divisor device is in a shifted over relation to obtain this setting. After the entries have been made as above explained, the machine automatically proceeds to subtract the divisor amount by over and over subtraction from the amount standing in the dividend counter. Subtraction is effected beginning at the left of the divisor. As such subtraction proceeds the amount of the quotient is run up in the DD accumulator to the left of the columns which previously contained the dividend. When the subtraction has proceeded to such a point that the remainder goes back of zero, the machine automatically stops subtraction and then reintroduces into the DD receiving device $\frac{1}{10}$ of the divisor. This operation obviates an extra adding back operation because it concurrently effects adding back and a subsequent subtraction.

The foregoing explains generally the manner of operation of the machine upon division. The present machine upon division operates in substantially the same manner as the machine shown and described in the application of Messrs. Bryce and Dickinson, Serial No. 733,076, filed June 29, 1934, now Patent No. 2,165,220. In both multiplying and dividing operations after the complete results are accumulated such results are recorded back on a record from which the data entering into the calculation is derived.

Shifting from multiplying to dividing and vice versa

According to the present machine, the calculating section comprises certain receiving devices or accumulators which are commonly used for either multiplication or division. All of the receiving devices are utilized on multiplying computations and on division computations only the MP receiving device is idle and not used. In order to quickly shift the machine from a status in which it is capable of effecting multiplication to a status in which it is capable of effecting division or vice versa, use is made of insertable plug board elements. This insertable plug board construction is of a type now known in the art and the insertable plug unit assembly is generally indicated at 413 in Fig. 5. Devices of this type are generally known as automatic plug boards and a suitable form of automatic plug board is shown and fully described in the copending application of D. C. Lake, Serial No. 10,299, filed March 8, 1935.

Such automatic plug board arrangements comprise a series of relatively fixed machine sockets to which the fixed machine wiring is connected. Adapted for cooperation with such sockets are plug prongs carried by a replaceable plug board assembly or unit. Such plug prongs on the replaceable board are in turn connected to plug sockets upon the replaceable board. These board sockets may be in turn plugged up by the operator selectively at will or the entire board may be preplugged with a desired set of connections. In certain cases the plug boards in lieu of having flexible plug connections for the fixed wiring utilize relative fixed rigid wiring connections from plug prong to plug prong. Such an arrangement provides a simple and expeditious way for concurrently making a great number of circuit connections and for changing the circuit connections inasmuch as a complete board can be pre-wired or pre-plugged and by a single operation placed in cooperation with the machine sockets to which the fixed machine wiring is connected. In the accompanying description, the machine sockets will be numbered and it will be understood that the connections which are made from machine sockets to machine sockets comprise all of the circuit connections made by the insertable board. Such connections include the board plug prongs, the board sockets, the board plug connections or the board prongs and the board fixed wiring from prong to prong.

Fig. 11 shows diagrammatically the general arrangement of an automatic plug board. Such figure requires no detailed explanation in view of the legends thereon and in view of the foregoing general description.

In the drawings, the insertable unit pre-wired for multiplication is shown in Fig. 8 and the unit pre-wired for division is shown in Fig. 9.

Referring now to Figs. 8 and 9, it will be noted that there is a dividing line substantially ⅔ down each sheet. Wiring above this line is the relatively fixed function controlling wiring. The sockets below these lines are the sockets which are provided for entry directing and result directing plugging. These may be pre-wired for a typical record card form as shown. In lieu of utilizing a single insertable plug unit comprising both a function controlling wiring section and an entering wiring section, separate insertable plug board units may be provided, i. e. the unit for function and sequence control could be separate from the entry and/or result readout controlling section. This would permit of leaving the function controlling section in place say for a series of multiplying computations and changing the entry controlling or result readout section as the card form varies with different types of runs.

According to the present invention the use of all switches is wholly obviated. The use of selected plug connections to be made individually by the operator of the machine to convert the machine from a dividing status to a multiplying status and vice versa, is also obviated because all of the circuits are made concurrently by the insertable plug board units. Such units may be pre-plugged or pre-connected.

Before describing the circuit diagram of the machine a brief explanation will be given of the plug board table (Fig. 10).

Referring to the plug board table (Fig. 10) it will be noted that three columns are provided on this plug board table. In the first column the plug sockets are all numbered consecutively. The second column indicates the numbers of the sockets to which the sockets in the left hand column are connected for multiplying if a wiring connection is to be made. For example, on multiplying a connection is made from socket 40 on Fig. 1f to socket 39 on Fig. 1f. On division a connection would be made from socket 40 on Fig. 1f to socket 299 on Fig. 1e. It will be understood that all of the foregoing connections are pre-made on the insertable plug units. By reference to the diagram in view of the consecutive arrangement of the figures in the first column, it will be possible to ascertain where a plug connection goes from any plug socket on the entire wiring diagram. For example, picking at random socket 193 on Fig. 1h, by reference to the table, Fig. 10, it can be ascertained that from socket 193, a connection is made to socket 156 on Fig. 1h for multiplying and that on dividing the connection would be made from 193 to socket 172 on Fig. 1h.

Referring further to the plug board table (Fig. 10) the sockets numbered from 15 to 26 inclusive, are sockets pertaining to the entry and result directing sections of the insertable plug boards, such portion being shown below the dividing line in Figs. 8 and 9. The sockets numbered from 35 upwards are sockets which pertain to the function controlling section of the insertable plug board.

*Circuit diagram—multiplying operations*

Figure 1A:
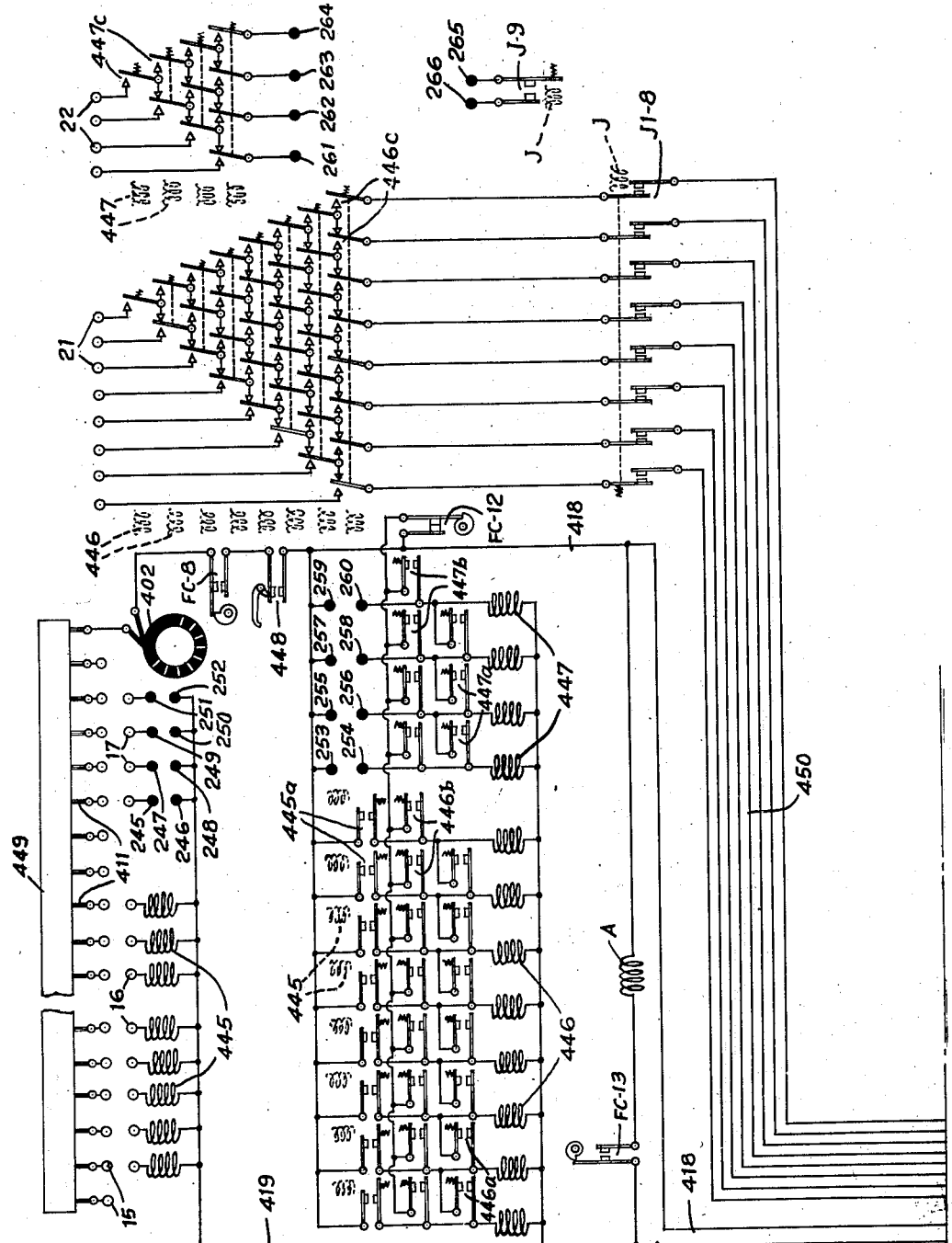
Figure 1C:
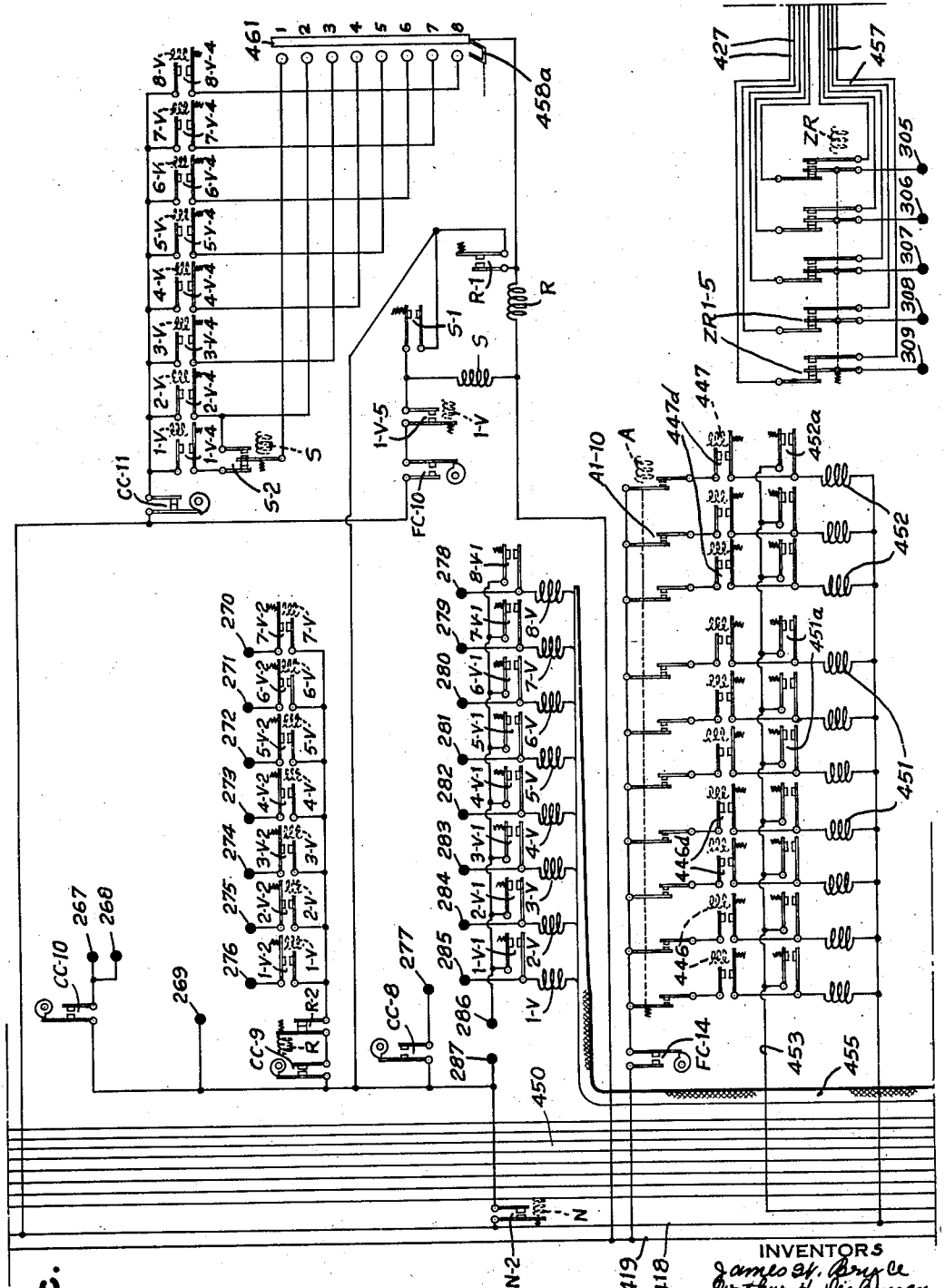
Figure 1F:
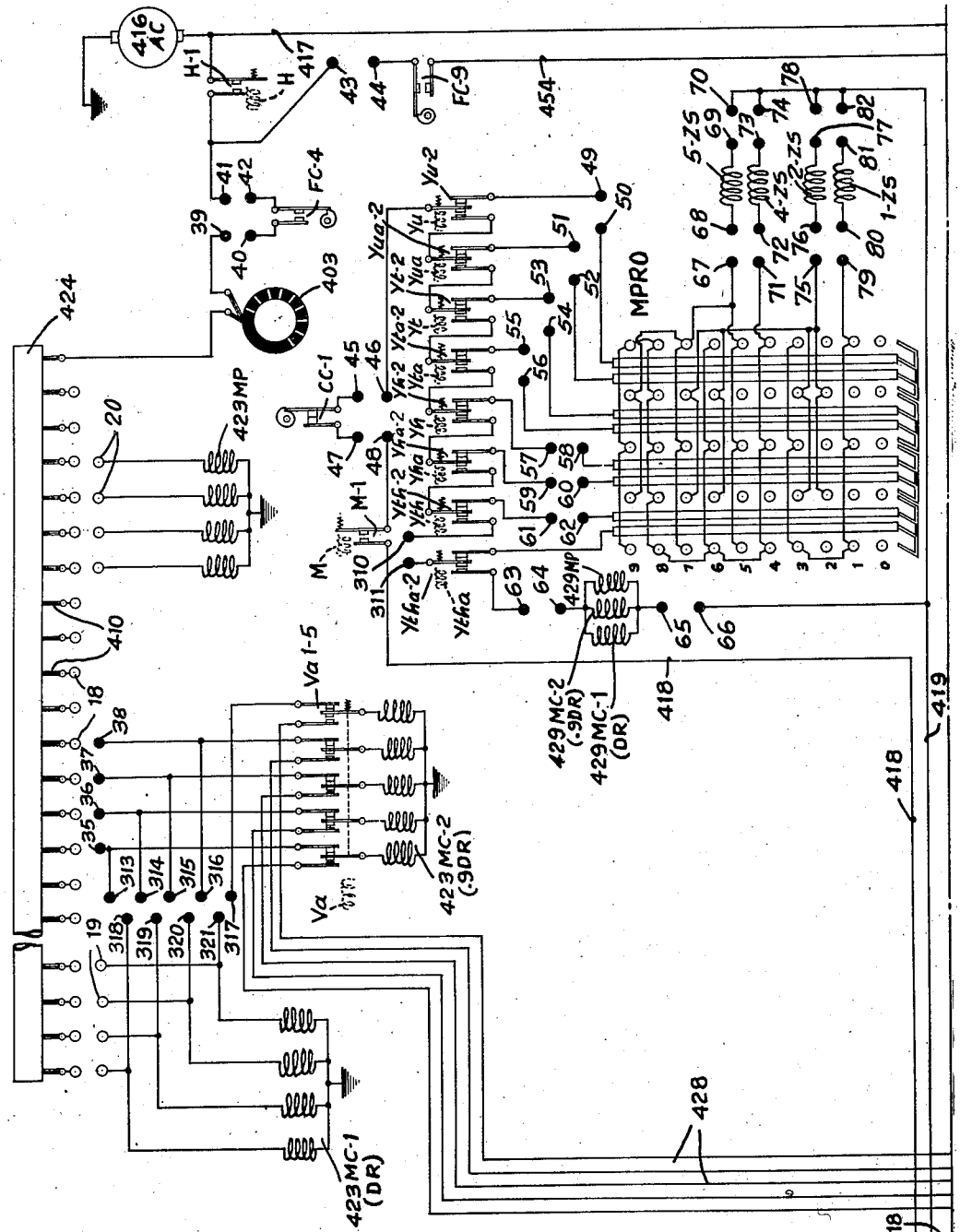

It will be assumed that the insertable plug board unit is pre-wired as shown in Fig. 8 for multiplying and according to the indicated plugging on the plug board table, Fig. 10. The operator upon starting up the machine for computation, places the insertable plug board unit in the plug board receiving section of the machine, and places a supply of properly perforated cards in the supply magazine 414 (Fig. 5b). As explained before, the insertable plug boards serve in lieu of all of the multitudinous switches heretofore provided, the only switch remaining and used is the switch 415 (Fig. 1k) which is first closed to supply current for the main driving motor M and for the punch driving motor M—2. Rotation of the main driving motor puts into operation the A. C.—D. C. generator 416 (Figs. 5, 1f and 1k). The A. C. end of this generator supplies current to bus 417 and to ground and the D. C. end of the generator supplies current to buses 418 and 419.

The start key is now depressed to close start key contacts 420 (Fig. 1k) and to complete a circuit from the 418 side of the D. C. line, through relay coil C, through relay contacts G—1 now closed, cam contacts FC—1 to the 419 side of the D. C. line. A stick circuit is established through relay contacts C—2 and cam contacts FC—2 now closed. Energization of relay coil C closes relay contacts C—1 establishing a circuit from the 418 side of the D. C. line through relay contacts F—1 now in the position shown, through card feed clutch magnet 421 (see also Fig. 5a), through cam contacts FC—3 now closed and through stop key contacts 422 now closed, through relay contacts C—1 now closed, through relay contacts M—3 now closed, through punch control contacts P—1 now closed and back to line 419. As in previous machines the start key must be kept depressed for the first four counter cycles in starting up a run or alternatively, it may be depressed, released and again depressed and released. Starting operations are prevented until the feed rack of the punch is in proper right hand position. This is provided for by contacts P—1.

The arrangement of the plugging or pre-wired connections of the insertable plug board units will be such that the amount of the multiplier will be entered from the multiplier field of the card into the MP receiving device. 423MP designate the counter magnets of this receiving device. The pre-plugging connections also provide for the entry of the multiplicand directly into MC—1 and MC—2. 423 MC—1 designate the counter magnets of the MC—1 accumulator and 423MC—2 designate the counter magnets of the MC—2 accumulator. The entry into the MC—2 accumulator is via contacts Va 1—5 (see Fig. 1f) and which contacts are in the position shown for the entry from the card. It will be understood that during the second card feed cycle the card traverses the sensing brushes 410 and the multiplicand and multiplier amount are read from the card and entered into the proper receiving devices. At the end of the first card feeding cycle the card lever contacts 412 (see Figs. 5b and 1k) will be closed by the card, causing energization of relay coil H (Fig. 1k) and causing relay contacts H—1 to close. As the second card feed cycle ensues the card is carried past the brushes 410 and the factor amounts are entered into the multiplier and multiplicand receiving devices. The entry circuits will now be traced.

Current flows from the A. C. line 417 (Fig. 1f) through relay contacts H—1 now closed, through the plug connection between sockets 41 and 42 on the insertable plug board, through cam contacts FC—4, which close at the proper time in the cycle, through the plug connection from 40 to 39, through impulse distributor 403, through the card contact and transfer roll 424, thence through the brushes 410, through the plug connections of the insertable plug board to the multiplier entry receiving device magnets 423 MP. Entries of the multiplicand are also made directly into MC—1 and through the now closed Va 1—5 contacts to MC—2.

The hand initiating control is cut off after machine operations have been properly started. This is brought about in the following manner. At the beginning of the second card feed cycle, the closure of cam contacts FC—5 (Fig. 1k) will cause relay coil G to become energized. Current flows from line 418, through relay coil G, through cam contacts FC—5, through card lever contacts 412 now closed and back to the other side of the line. The energization of relay coil G will shift the relay contacts G—1 to reverse position thus interrupting the circuit to the start key contacts 420 but maintaining the circuit to cam contacts FC—1. Energization of relay coil G will also close relay contacts G—2 and establish a stick circuit for relay coils G and H, through either the FC—1 cam contacts or the card lever contacts 412.

On the following counter cycle, provision is made for reading out the amount of the multiplicand from the MCRO—1 readout and for entering this multiplicand amount into the MC—2 entry receiving device so that the multiplicand times 2 will be set up therein by an adding operation. It may be explained that after the entry of the multiplicand from the card into MC—2, the relay contacts Va 1—5 (Fig. 1f) shift to reverse position from that shown to provide a connection to circuits leading to the MCRO—1 readout. Shift of the Va 1—5 contacts is brought about by energization of relay coil Va. Relay coil Va is energized upon closure of cam contacts FC—6 (Fig. 1k), the circuit being completed through relay contacts G—3 now closed under the control of relay coil G which was energized as previously described. This brings about energization of Va which shifts the Va 1—5 contacts (Fig. 1f).

Referring now to Fig. 1h, alternating current impulses on line 417 flow over through the plug connection from socket 208 to 209 to impulse emitter 400 which impresses impulses on lines 425, and from these lines the impulses flow over the transverse bus wiring of the MCRO—2 readout to wires in cable 426, and thence through the transverse bus wiring of the MCRO—1 readout through the brushes of the readout, thence out on lines 427 up on lines 428 (Figs. 1h, 1g and 1f), through the now shifted Va 1—5 contacts to the 423 MC—2 accumulator magnets. By this operation the amount of the multiplicand will be entered into MC—2 so that it will now have standing on it a set up of MC×2.

Figure 1G:
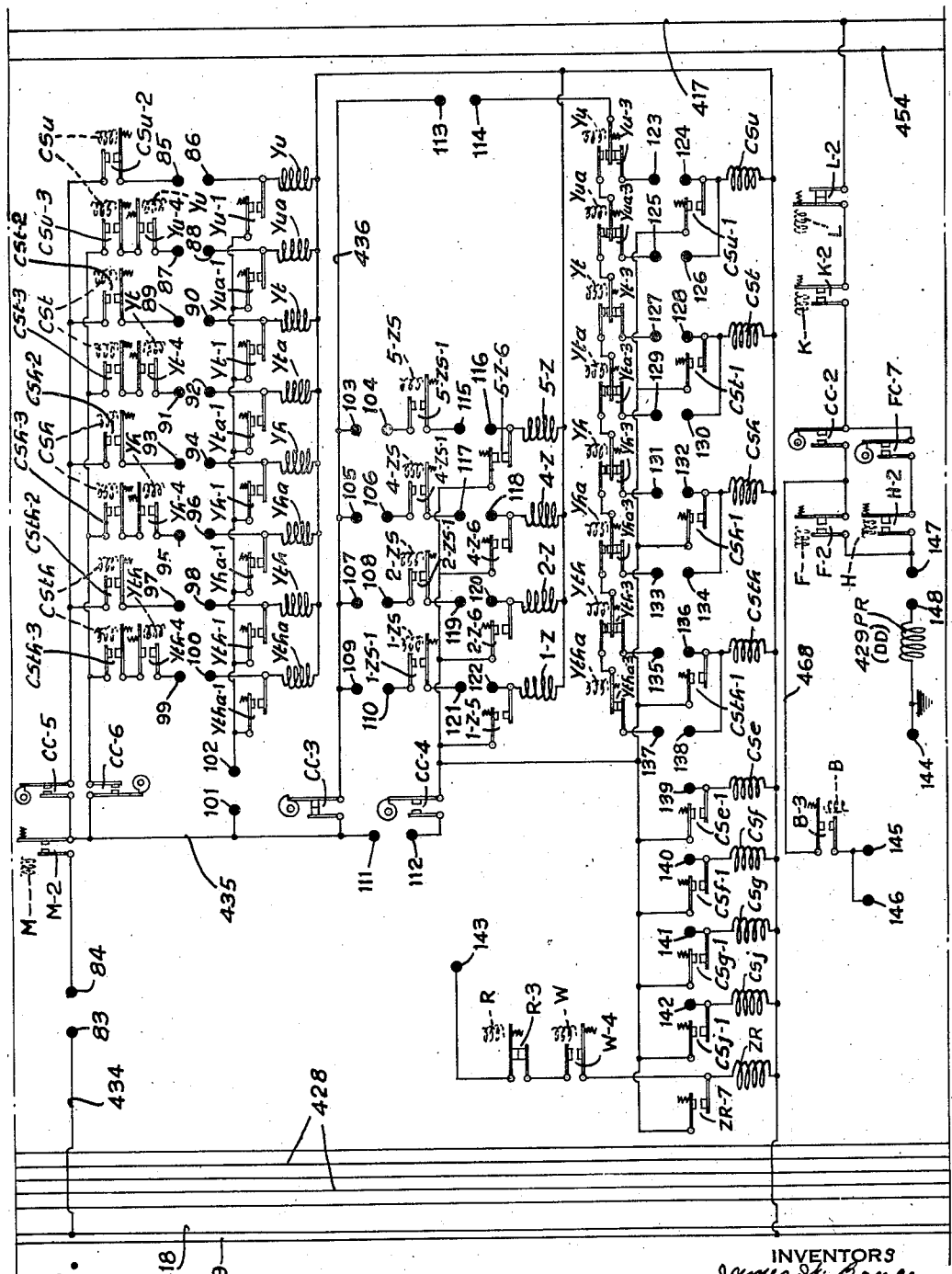

It may be explained that during the same counter cycle in which the multiplicand amount was entered from MCRO—1 into MC—2 that the product accumulator is reset. This operation is brought about in the following manner. Referring to Fig. 1g, current flows from line 417 to relay contacts L—2 now closed, through relay contacts K—2 now closed, such contacts being closed by the energization of relay coil K (Fig. 1k) when the left hand punch rack is in the last column position, thence through cam contacts FC—7 which close at the proper time in the cycle, thence through relay contacts H—2 now closed, through the plug connection from socket 147 to 148 to reset magnet 429PR and back to ground. Energization of 429PR effects reset in the usual manner (see Fig. 5).

In starting up the machine the usual punch racks shown in the Cunningham and Oldenboom patents are in extreme outer position and accordingly contacts P—1, P—2, P—3 and P—5 (Fig. 1k) are closed. With contacts P—5 closed, relay coil K will be energized and relay contacts K—2 (Fig. 1g) will be in closed position.

The card is fed through the card handling section of the machine and ultimately such card passes to the R position in the punch closing card lever contacts 430 (Figs. 1k and 5b), energizing relay coil F and shifting relay contacts F—1 to reverse position from that shown. Upon the shifting of relay contacts F—1 and upon closure of cam contacts CC—7, a circuit will be established to the punch clutch magnet 431. This circuit is completed through punch contacts P—3 now closed and through relay contacts K—1 now closed. Energization of the punch clutch magnet 431 will cause closure of contacts 432 which become latched closed by a latch 433. Accordingly, current supply is provided for the punch driving motor M—2. The card which has been previously read and which is in the punch unit in the R position is now advanced to a position at which punching may commence.

Multiplication according to the present invention, which is effected by the readout of selected multiples of the entered multiplicand, i. e. sub-products and by the addition of such sub-products, is initiated by the reset of the product accumulator. PR reset is brought about as previously described. During such reset, reset contacts 405 (Figs. 1k and 5) close and a circuit is established to relay coil L causing opening of relay contacts L—2 (Fig. 1g) to prevent a repetition of PR reset. It may be explained that this circuit to relay coil L is completed through the plug connection on the insertable board made between sockets 239 and 240. A stick circuit is established for relay coil L through relay contacts L—1. Such circuit extends to the other side of the line, through punch contacts P—2. Punch contacts P—2 open to cause the relay coil L to become de-energized when a card is fed from the R position in the punch. The machine is now ready to effect multiplication by the addition of selected multiples of the entered multiplicand. Upon the reset of the PR accumulator, a circuit is established traced as follows. From the 419 side of the D. C. line (Fig. 1k) through the reset contacts 404 of the PR accumulator, through a plug connection between socket 243 and 244, through relay coil M, to the other side of the line 418. Energization of relay coil M closes relay contacts M—1 (Fig. 1f), M—2 (Fig. 1g) and M—4 (Fig. 1k) and causes opening of relay contacts M—3 (Fig. 1k). Relay contacts M—4 establish a stick circuit for relay coil M, through the now closed multiplicand reset contacts 409.

It will be assumed that the computation being performed by the machine is that shown in Fig. 6, viz. multiplying 4802 as the multiplicand by 12 as the multiplier. In the manner previously explained, 4802 will be set up in MC—1, five times this amount being available for read out from MCRO—5, see the dotted line figures 24010. On the cycle following the entering cycle from the card 4802 is read out from MCRO—1 and entered into MC—2 so that following this transfer cycle 9604 will be set up in MC—2 and twice this amount will be available for read out from the MCRO—4 readout section. After the entry and setup cycles have been completed, the machine is ready to carry out the entry operations and obtain the product result. The multiplier 12 will be set up in MP and the first operation of actual computation is to effect a multiplication by 2 in the units order. Accordingly, the brush in the units order of the MPRO readout will be standing upon 2.

Before explaining the sequence of events which follow, it may be explained that in multiplying by 2 in the units order that twice the multiplicand is entered not on the first entry cycle into the products accumulator, but on the second entry cycle into such products accumulator.

Referring now to Fig. 1f and recalling that the units order brush of the MPRO readout stands upon the 2 spot, the completion of a circuit will be attempted from the 418 line through relay contacts M—1 now closed, through the plug connection at 48—47, through cam contacts CC—1, through the plug connection at 45—46, through the Yu—2 transfer contacts now in the position shown, through the plug connections at sockets 49—50, thence into the units order common segment of the MPRO readout. There is no outflow, however, from the brush at this time because the 2 segment spot is unwired. Notwithstanding the fact that this circuit is not completed from the 2 segment spot of MPRO, a circuit will be completed traced as follows. Referring to Fig. 1g, current flows from the 418 line, via wire 434, thence through a plug connection 83—84, through relay contacts M—2 now closed, via wire 435, through cam contacts CC—3, via wire 436, through plug connection between sockets 113 and 114, through the Yu—3 transfer contacts now in the position shown, through a plug connection between sockets 123 and 124, thence to and through column shift relay coil CSu and back to the other side of the D. C. line 419. It may be explained that the relay coil CSu has not only the usual multi-contact column shift contacts as shown on Fig. 1j, but it also has supplemental contacts CSu—1, CSu—2, CSu—3 (Fig. 1g). The CSu—1 contacts are stick contacts to maintain CSu energized during the entry period of a cycle. The stick circuit is completed through the CSu—1 contacts, via the wire connection to the CC—4 contacts, through these contacts and through plug connection between 112 and 111, wire 435, through relay contacts M—2 now closed, through a plug connection between sockets 83 and 84, wire 434 to the other side of the line 418. Notwithstanding the fact that the multicontact column shift contacts of the CSu relay (Fig. 1j) are closed, no entry will flow to the products accumulator during the first entry cycle. However, the energization of CSu, brought about during this first attempted cycle of entry into the products accumulator, will close relay contacts CSu—2 (Fig. 1g) and upon closure of cam contacts CC—5 a circuit will be completed through CC—5, through CSu—2, through the plug connections between sockets 85—86 to the Yu relay coil and back to the other side of the line. Energization of Yu will close contacts Yu—1 to provide a stick circuit for Yu. The stick circuit extends back to the line 435 via plug connections between sockets 101 and 102. With relay coil Yu energized in this manner, the transfer contacts Yu—3 (Fig. 1g) and Yu—2 (Fig. 1f) will shift to reverse position from that shown. Relay contacts Yu—4 (Fig. 1g) will also become closed. The machine is now ready to enter twice the amount of the multiplicand into the products accumulator.

Referring again to Fig. 1f, current will flow from line 418, through relay contacts M—1 now closed, via plug connection between 48 and 47, through cam contacts CC—1, through plug connection between 45 and 46, through the Yu—2 transfer contacts now in shifted position, down through the Yua—2 transfer contacts in the position shown, through plug connection between sockets 51 and 52, into the other units order common segment strip of the MP readout, out via the units order brush which is standing on the 2 spot of this readout over through plug connection between sockets 75 and 76, through the 2—ZS relay coil, through the plug connection between 77 and 78, to the other side of the line 419. The energization of 2—ZS will effect closure of relay contacts 2—ZS—1 (Fig. 1g). Accordingly, upon closure of cam contacts CC—3 current will flow through plug connection at sockets 107—108, through relay contacts 2—ZS—1, through plug connection at sockets 119—120, to energize the 2—Z relay coil. Concurrently with the energization of relay coil 2—Z, column shift relay coil CSu is re-energized. The reenergizing circuit for CSu is via the following path. From cam contacts CC—3, via wire 436 to the plug connection at sockets 113—114, through the Yu—3 transfer contacts now in shifted position, through the Yua—3 transfer contacts now in the position shown, through plug connection at sockets 125—126, back through relay coil CSu to the other side of the line. As explained, the 2—Z coil and the CSu coil are concurrently energized. Such coils are maintained energized by stick contacts respectively designated 2—Z—6 and CSu—1. The stick circuit is through cam contacts CC—4 and a plug connection at sockets 111—112 to line 435. The energization of 2—Z causes closure of contacts 2—Z 1—5 (Fig. 1h) and the energization of CSu closes its corresponding column shift multi-contacts shown on Fig. 1j.

Referring now to Fig. 1h, with emitter 400 in operation and current impulses supplied therethrough from line 417 through plug connection at sockets 208—209, impulses flow to the line 425, thence via the transverse buses to the MCRO—2 readout, thence through the brushes of this readout on out via lines 437, through the 2—Z 1—5 contacts now closed, down through the lines 438, through the CSu column shift relay contacts now closed and to the entry circuits to the PR accumulator magnets designated 423PR on the diagram, Fig. 1j. By the foregoing operation twice the amount of the multiplicand will be entered into the products receiving device in proper columnar relation therein.

The following operation is to enter the multiplicand itself in the products receiving device in proper shifted over columnar relation. During the entry of the multiplicand times 2 into the products receiving device preparatory circuits are set up to pre-condition circuits and relays for the next entry of the multiplicand times one into the products receiving device. During the previous entry CSu was energized as previously explained and the CSu—3 contacts were closed. The Yu relay coil was energized as previously explained and the Yu—4 contacts were closed. Therefore upon closure of cam contacts CC—6 (Fig. 1g) current flows through relay contacts CSu—3, through the Yu—4 relay contacts now closed, through the plug connections at sockets 87—88 to energize the Yua relay coil. This coil is maintained energized by the closure of stick contacts Yua—1. The energization of Yua brings about a shift of transfer contacts Yua—2 (Fig. 1f) and Yua—3 (Fig. 1g).

The foregoing operations prepare the circuits for beginning operations on the tens order of the multiplier amount. It may be here explained that on the first product entering cycle for the tens order of the multiplier that no entry will be made into PR, and the cycle will be idle. However, upon the following cycle the entry will be made. Starting from the 418 line, current will flow through relay contacts M—1 through plug connections at sockets 48—47, through cam contacts CC—1, through plug connections at 45—46, through contacts Yu—2 in shifted position, through contacts Yua—2 in shifted position, through contacts YT—2 in shifted position, through contacts Yta—2 in the position shown (i. e. non-shifted), via plug connections at 55—56, down through the MPRO readout in the tens order, out through the brush standing on the 1 segment spot, through plug connections at sockets 79—80, to energize relay coil 1—ZS, the circuit being completed through plug connection at sockets 81—82. Energization of relay coil 1—ZS will ultimately bring about energization of relay coil 1—Z and concurrently with this operation relay coil CSt becomes energized so that the amount of the multiplicand itself may be read out from MCRO—1 and entered via the relay contacts 1—Z 1—4 (Fig. 1h) and the column shift contacts related to the CSt magnet (Fig. 1j), into the 423PR accumulator in proper columnar relation therein.

It may be explained that if a multiplier amount is an amount such as 98, the machine will effect multiplication by 8 in the units order by entering MC×4 on one cycle and MC×4 again without column shift on a second cycle. The complete operation need not be traced, but assume the units order brush in MPRO is standing on the 8 spot. When CC—1 closes a circuit is completed from the line 418, through relay contacts M—1 now closed, via plug connections from 48 to 47 (Fig. 1f), through CC—1, via plug connections from 45 to 46, through the Yu—2 contacts now in the position shown, through plug connections from 49 to 50, thence to the units order common segment, through the brush standing on the 8 spot, through transverse bus wiring to the 71 plug socket, via the plug connection to 72, to and through 4ZS and through plug connection between 73 and 74 to line 419. This will bring about the energization of 4ZS on the first cycle and close the related contacts 4ZS—1 to 5 and permit a readout of MC×4 from the associated readout device. After this readout and entry has taken place, relay contacts Yu—2 become shifted. Then upon the next closure of CC—1 on the cycle, a circuit is completed through the now shifted Yu—2 contacts, through the Yua—2 contacts now in the position shown, through plug connection between sockets 51 and 52, through the left hand common segment of the units order of MPRO, through the units order brush now standing on the 8 spot and thence through the circuit previously traced to re-energize 4ZS on the second cycle. In this way there is a second entry of MC×4 into the proper accumulator. On the next or third cycle, since the tens order brush is standing on 9, a circuit will be completed starting at the CC—1 contacts, through the plug connection at 45, 46, through relay contacts Yu—2 and Yua—2, now shifted and through relay contacts Yt—2 now in the position shown, through plug connections between sockets 53 and 54, through the right hand common segment in the tens order of MPRO, through the tens order right hand brush now standing on 9, through the transverse bus wiring over to sockets 67, via a connection between this socket and socket 68, through the relay coil 5ZS, via connection between 69 and 70 to wire 419. This energization of 5ZS will close the related multi-contacts and permit a readout of five times the amount of the multiplicand on the third cycle. The entry being made in proper columnar relation. On the fourth cycle, the left hand tens order brush of MPRO, standing on the 9 spot is effected to energize 4ZS relay coil. It seems unnecessary to trace the complete circuit through the various plug sockets for this entry.

Inasmuch as the present invention includes no cycle controller for eliminating idle cycles where zero appears in columns of the multiplier, idle machine cycles follow the foregoing operations, two idle cycles taking place for each column of the multiplier. During such succeeding idle cycles relay coils Yh, Yha, Yth and Ytha successively become energized so that ultimately all of the Y relay coils become energized. With all of such Y coils energized, all of the Y—2 transfer contacts (Fig. 1f) become shifted to reverse position from that shown. At this state in the operation of the machine the complete product will have been set up in PR and the machine is ready to reset the two MC accumulators and the MP receiving device. Such reset is brought about in the following manner.

Referring to Fig. 1f, a circuit is completed from line 418, through relay contacts M—1, through plug connection at 48—47, through the CC—1 cam contacts, through plug connection at 45—46, through the shifted Y—2 contacts, through plug connection at 63—64, to and through the 429MC—1 reset magnet, the 429MC—2 reset magnet, and the 429MP through plug connection at sockets 65—66 and back to the other side of the line 419. The energization of the reset magnets brings about reset of the MC—1, MC—2 and the MP entry receiving devices. During reset of the MC—2 accumulator, various operations take place. Upon such reset (see Fig. 1k) contacts 409 open to break the stick circuit for relay coil M. De-energization of coil M opens relay contacts M—1 (Fig. 1f) and terminates multiplying operations. Contacts M—2 also open (Fig. 1g) to terminate column shifting and associated operations. Contacts M—3 (Fig. 1k) re-close to allow the circuit to the card feed clutch magnet 421 to be re-established. Reset contacts 408 (Fig. 1k) close to complete a circuit to relay coil B. This circuit is completed through a plug connection at sockets 241—242. Upon energization of relay coil B, a stick circuit is established by means of stick contacts B—1, the circuit being completed through the PR reset control contacts 406.

The machine is now ready to punch back the product on the record card, which operation is initiated in the following manner. With relay coil B energized, relay contacts B—2 close, whereupon current will flow from line 419, through contacts B—2 now closed, through the punch escapement contacts 439, to a line extending to the punch readout strip 440. With current thus supplied to the readout strip and with the brush of the readout strip standing on the first of the spots at which punching is to commence, punching operations will start, there being a readout from the PRRO readout and a successive energization of the punch selector magnets 441. The closure of relay contacts B—2 (Fig. 1k) also supplies current to contacts 442 in the punch which contacts are closed by interposer action to supply current to the punch operating magnet 443. Punching now proceeds and will continue until the complete product is read out and punched. When the punching operation is completed contacts P—5 will become closed, energizing relay coil K, closing relay contacts K—1 and establishing a circuit to the ejector magnet 444. The punched card will then be ejected from the punch. A new operation will then be initiated for the succeeding record card.

It may be explained that result punching is initiated during the cycle in which MC—1, MC—2 and MP reset takes place. Punching may extend over into the following first counter cycle of the succeeding card feed cycle. Re-energization of card feed directly follows MC reset and is initiated by the closure of the reset controlled contacts 407 which are associated with the MC—2 reset device. Upon closure of such contacts 407, the relay coil C is energized, causing closure of the C—1 contacts which brings about a re-energization of the card feed clutch magnet 421. Relay coil C is maintained energized by stick contacts C—2, the stick circuit being completed through cam contacts FC—2. Result punching continues into the card feed cycle following MP and MC reset. If punching is completed during the first machine cycle of the card feed cycle, PR reset will be initiated as previously described, but it will be briefly repeated here.

Upon closure of the FC—7 cam contacts and upon closure of K—2 relay contacts, a circuit is completed from line 417, through relay contacts L—2 and K—2 now closed, through cam contacts FC—7, through relay contacts H—2 now closed, through plug connection at sockets 147—148, through the 429PR reset magnet and back to ground.

If on the other hand, the completion of punching is deferred until after the first machine cycle of the card feed cycle, PR reset will be initiated via the following circuit. From line 419 (Fig. 1g), through contacts L—2 and K—2 now closed, through cam contacts CC—2, through relay contacts F—2, through plug connection 147—148 and through the 429PR reset magnet. Upon PR reset, a new operation pertaining to a following card will be initiated. The PR reset brings about energization of relay coil M upon closure of the reset control contacts 404 (Fig. 1k). Succeeding multiplying computations will thereupon take place and the operation will follow in the manner previously described.

It may be explained that upon PR reset, contacts 406 open to break the stick circuit for relay coil B and to cause the B—2 relay contacts to open up the circuit to the punch operating magnet and to cut off the circuit to the readout strip of the punch.

*Dividing operations*

Before explaining in detail the circuit diagram of the machine, when it is pre-set for dividing calculations generally, it may be explained that upon division the dividend is derived from the card and entered into the result receiving device, which, on multiplying, received the product. This result receiving device is accordingly given a dual legend, viz. PR (DD). During dividing calculations, the quotient is run up in this result receiving device in columns thereof to the left of the dividend or remainder in such counter. The divisor is entered into the MC—1 receiving device and likewise it is entered into MC—2. MC—1 is accordingly given a dual legend (DR). MC—2 is utilized for a $\tfrac{1}{10}$ divisor setting and is accordingly given a supplemental legend (.9 DR). During dividing calculations, no use is made of the MP entry receiving device, such device being idle.

On changing the machine from a multiplying to a dividing status, the insertable function controlling plug board used on multiplication is removed and such insertable plug board is replaced with the insertable plug board for controlling the various dividing functions of the machine. Likewise the entry directing insertable plug board is replaced with a proper entry directing section for the particular dividing calculations to be performed. As explained above, the entry directing and function controlling sections of the plug board may be combined into a unitary board and it will be presumed that the machine will be operated with a single board for function control and entry control. Accordingly to set up the machine for dividing operations the insertable plug board shown on Fig. 9 is placed in the receiving element shown in Fig. 5 at 413. The plug connections which will be established by placing the dividing plug board in position are shown in the plug board table Fig. 10. On dividing it will be understood that the plug connections are made from the sockets in the first column to the sockets in the third column, the third column being labeled "Dividing".

Circuit diagram for division

It will be assumed that properly perforated cards perforated with the amount of the divisor and dividend are in the supply magazine 414 of the card handling section of the machine (see Fig. 5b). To start the machine in operation main line switch 415 (Fig. 1k) is first closed to supply current to the main driving motor M and for the punch driving motor M—2. With the main driving motor M in operation the 416 A. C.—D. C. generator supplies current to the lines as in multiplying computations. The start key is now depressed to close start key contacts 420 (Fig. 1k) and to complete a circuit from the 418 side of the D. C. line, through relay coil C, relay contacts G—1 now closed, cam contacts FC—1, to the 419 side of the D. C. line. A stick circuit is established through relay contacts C—2 and cam contacts FC—2 now closed. Energization of relay coil C closes relay contacts C—1 establishing a circuit from the 418 side of the D. C. line through relay contacts F—1, through card feed clutch magnet 421 (see also Fig. 5a), through cam contacts FC—3 now closed, through stop key contacts 422 now closed, through relay contacts C—1 now closed, through relay contacts M—3 now closed, through the punch control contacts P—1 now closed and back to line 419. As in previous machines the start key must be kept depressed for the first four counter cycles in starting up a run or alternatively it may be depressed and released and again depressed. Starting operations are prevented until the feed rack of the punch is in proper right hand position, this being provided for by contacts P—1.

The plug connections in the insertable plug board will provide for the entry of the divisor and dividend into their respective receiving devices. It may be briefly explained that connections are made from sockets 18 (Fig. 1f) to sockets 21 and 22 (Fig. 1a). From sockets 21, the entries flow to the DD counter and from sockets 22, via plug connections made from sockets 261 to 264 inclusive, to sockets 35 to 38 inclusive (Fig. 1f). These latter connections provide for the entry of the divisor into the divisor entry device and into the $\frac{1}{10}$ divisor entry receiving device. Other plug connections at the insertable plug board will properly plug up the advance or pre-sensing brushes 15 (Fig. 1a) to certain controlling relays. It may be explained that the relay coils 1—ZS, 2—ZS, 4—ZS and 5—ZS, which were used for another purpose on multiplication, are utilized for divisor field relays when the machine is used for division. The manner of plugging up one of these relays will be traced as the other relays are plugged up in a generally similar manner according to the plug table (Fig. 10). The plug connections for one relay are as follows. From sockets 245 (Fig. 1a) a plug connection is made to socket 80 (Fig. 1f) and from socket 81, a plug connection is made back to socket 246 (Fig. 1a). Not only are the relay coils themselves plugged up differently than they were for multiplying operations, but the controlling contacts also are differently plugged up. The plugging for the contacts 1—ZS—1 of relay coil 1—ZS is as follows. A plug connection is made from socket 253 (Fig. 1a) to socket 110 (Fig. 1g) and from socket 121 a connection is made back to socket 254 (Fig. 1a). The contacts and the other relays are similarly plugged as per the details on the plug board table (Fig. 10).

Separate relays are provided for the controlling operations pertaining to the dividend field. Such dividend field relays are shown on Fig. 1a, the same being designated 445. Each dividend field relay has related contacts which will be given the same reference numeral with a suffix a, i. e. 445a are the contacts pertaining to the 445 relay. The manner of plugging up the dividend field relays 445 will be traced for a given relay. For energizing the relay from the advance sensing brushes 411 connections are made from sockets 15 to 16 (Fig. 1a). When contacts such as 445a are closed upon energization of its corresponding dividend relay 445, such closure serves to energize a related relay coil 446. When one of the ZS relay coils pertaining to the divisor field is energized, it serves to energize a related relay coil 447. Relay coils 446 and 447 have associated therewith transfer contacts designated 446a and 447a. The function of these transfer contacts is this—when a transfer contact, for example 446a pertaining to a given denominational order is closed, the closure of such transfer contacts will serve to energize all of the coils 446 to the right or in relatively lower denominational orders. Transfer contacts 447a similarly control the energization of coils 447 pertaining to relatively lower denominational orders. Coils 446 and 447 likewise control stick contacts 446b and 447b and such stick contacts when closed establish stick circuits from the 419 side of the D. C. line through any one or more of the coils 446 and 447 and back to the 418 side of the D. C. line through cam contacts FC—12.

According to the selective energization of the coils 446 and 447 in the manner above explained, there is a selected directed entry of the dividend and divisor into their corresponding entry receiving devices. This is provided for by pyramidical contacts 446c and 447c (Fig. 1a). Such contacts, according to their selective closure, direct the entry of the dividend into the dividend entry receiving device so that it always enters therein leaving two clear columns to the extreme left in such receiving device. Similarly, pyramidical contacts 447c, according to their selective closure, selectively direct the entry of the divisor into each of its entry receiving devices so that it goes into the extreme left hand columns of both devices. In passing it may be stated that the pickup circuit for the relay coils 445 and the ZS relay coils is completed through the following path: referring to Fig. 1a, from line 418, through the card lever contacts 448 (see also Fig. 5b), through the cam contacts FC—8, through the impulse distributor 402, to the common contact plate 449 (see also Fig. 5b), thence via the brushes 411 and through the plug connections made between sockets 15, 16 and 17, through the relay coils 445 and ZS and back to line 419.

At the end of the first card feed cycle the first card will have been advanced to a point at which it is about to be read by the sensing brushes 410. During the second card feed cycle the card traverses the brushes 410 and the dividend and divisor amounts are entered into their respective receiving devices. The divisor it will be understood in this cycle, is entered into both the DR and the .9 DR receiving devices. At the end of the first card feeding cycle the card lever contacts 412 (Figs. 1k and 5b) will be closed by the card, causing energization of relay coil H and causing relay contacts H—1 (Fig. 1f) to close, as the second card feed cycle ensues, the card is carried past the brushes 410 and the divisor and dividend entry devices DR, .9 DR and DD respectively, receive their entries.

Before tracing the entry circuits, it may be explained that just after the card feed cycle is initiated, cam contacts FC—4 (Fig. 1f) close. Such contacts are plugged on dividing so as to energize relay coil J (Fig. 1e) upon their closure. With relay coil J energized, relay contacts J 1—8 (Fig. 1a) close and relay contacts J—9 become closed. Contacts J—9 are plugged back to sockets 39—41 (Fig. 1f) for dividing. The entry circuits for dividend and divisor amounts will now be traced. Current flows from the A. C. line 417 (Fig. 1f), through relay contacts H—1 now closed, through the plug connection between sockets 41 and 265 (Fig. 1a), through the J—9 relay contacts now closed, through the plug connection between sockets 266 and 39 (Fig. 1f), thence through the impulse distributor 403 to the card transfer and contact roll 424, thence through the brushes 410 pertaining to the divisor field, through the plug connections in the insertable plug board, through the pyramidical contacts 447c (Fig. 1a), through the plug connections from sockets 261 to 264 (Fig. 1a) to sockets 35 to 38 (Fig. 1f), and thence to the divisor entry device magnets 423DR and 423 .9DR. The circuit to the 423 .9DR magnets is through three-blade multi-contacts Va 1—5 which are in the position shown at the time the first entry is made. The circuit to the 423DR magnets is completed through plug connections made between sockets 313—316 to sockets 318—321. The entry circuits to the DD accumulator are through the path previously traced to contact roll 424, through the brushes 410 pertaining to the dividend field, through the plug connections in the insertable plug board, through the pyramidical contacts 446c (Fig. 1a), through relay contacts J1—8 inclusive and through a set of lines generally designated 450 (Figs. 1a, 1b, 1c, 1d, 1f) to the magnets 423DD pertaining to the dividend accumulator.

The hand initiating control is cut off after the operations have been properly initiated. This is effected in the following manner. At the beginning of the second card feed cycle the closure of cam contacts FC—5 (Fig. 1k) will cause relay coil G to become energized. Current flows from line 418, through relay coil G, through cam contacts FC—5, through card lever contacts 412 now closed and back to the other side of the line 419. The energization of relay coil G will shift relay contacts G—1 to reverse position interrupting the circuit to the start key contacts 420, but maintaining the circuit to cam contacts FC—1. The energization of relay coil G will also close relay contacts G—2 and G—3. The G—2 relay contacts will establish a stick circuit for relay coils G and H either through the FC—1 cam contacts or the card lever contacts 412. It may be explained that the making time of cam contacts FC—1 overlaps the time when the card lever contacts 412 open between cards.

It has been previously explained how the selective closure of pyramidical contacts 446c and 447c (Fig. 1a) selectively direct the entry of the dividend and divisor into their respective entry receiving devices. It will be understood that after the entries have been made into these devices that a further card pertaining to a succeeding computation will follow and pass the advance sensing brushes 411. Before such following card passes the brushes provision must be made for breaking down the setup which controls the pyramidical contacts 446c and 447c, but before breaking down such setup a retained setup must be made corresponding to the previous setup of 446c and 447c for controlling the subsequent reading out operations for recording result data pertaining to the computations related to the card which has been previously sensed. This retained setup is provided for in the following manner. Relay coils 446 and 447 in addition to controlling the contacts previously described, control supplemental contacts 446d and 447d (Fig. 1c). Before cam contacts FC—12 (Fig. 1a) open to de-energize relay coils 446 and 447, cam contacts FC—13 (Fig. 1a) will close to energize relay coil A. The energization of relay coil A effects closure of relay contacts A 1—10 (Fig. 1c) and accordingly when cam contacts FC—14 close, a circuit is provided through the now closed contacts A 1—10 to such of the contacts 446d and 447d which have become closed to thereby selectively energize relay coils 451 and 452. Such coils 451 and 452 have stick contacts 451a and 452a associated therewith and such stick contacts retain coils 451 and 452 energized after FC—14 and relay contacts A 1—10 open. The stick circuit from the 451a and 452a contacts is through a wire 453 (Fig. 1c) which extends down and across Fig. 1d over to Figs. 1j and 1k and such conductor extends to the DD reset contacts 406 from which the circuit is completed, back to the other side of the line.

It will be understood by the foregoing operation that the setup which was previously on relay coils 446 and 447 is now set up on relay coils 451 and 452 (Fig. 1c). The machine is now in a condition in which the initial stages of division by subtraction can be carried out. Such operations are automatically initiated in the following manner.

Referring to Fig. 1e, since relay contacts H—3 are already closed by the energization of relay coil H, at the time cam contacts FC—11 close, a circuit is completed from the 418 side of the D. C. line, through relay coil N. The energization of relay coil N closes stick contacts N—1 which maintain N energized. The stick circuit is completed through relay contacts T—2 now closed. With the energization of relay coil N, relay contacts N—2 (Fig. 1c) close.

The machine is now ready to create a set up of nine-tenths of the divisor amount and concurrently while this is being done, a first subtracting operation will be performed to diminish the dividend amount by the amount of the divisor. It will be recalled that the MC—1 entry receiving device has an MCRO—1 readout section. On dividing operations the MCRO—1 readout section must be converted into an inverting readout in order that a complementary value be read out therefrom. This conversion of the readout from a straight readout to an inverting type of readout is effected by means of the insertable plug board. Fig. 3 shows the wiring of the readout for use in multiplication and Fig. 4 shows the wiring of the readout with supplementary plug connections and certain relay contacts and an associated emitter when the readout is to be utilized as an inverting readout. Having converted the readout from a straight readout to an inverting readout by the use of an insertable plug board the machine is ready to effect subtraction. This is brought about in the following manner. The energization of relay coil G (Fig. 1k) will have closed relay contacts G—3, which upon closure of cam contacts FC—6 complete a circuit to energize relay coil Va. Energization of relay coil Va will effect a shift of relay contacts Va 1—5 (Fig. 1f) to reverse position from that shown.

With relay contacts Va 1—5 shifted and with relay contacts W—2 and W—3 (Fig. 1h) in the position shown, current will be supplied from line 417, via plug connection from socket 209 to 211, through the closed W—3 contacts, through a plug connection from socket 212 to 210 to emitter 401. The emitter 401 is wired to the inverting readout DRIV in the manner indicated in Fig. 4 and in the manner shown on the plug board table. Accordingly, with the emitter 401 in operation there will be a readout of the complement of the divisor from the DRIV readout and the impulses will flow out from the readout over the lines 427, up via lines 428 (Figs. 1h, 1g and 1f) to and through the Va 1—5 relay contacts to the 423 .9DR entry device magnets.

It will be understood that with contacts Va 1—5 shifted the entry will be made in this accumulator in orders each of which is relatively one order lower than heretofore, the previous entry from the card being relatively one order higher by reason of the plugging on such entry and that the complement of the divisor amount will be added into this entry receiving device in such columnar orders. There will thereupon appear in such entry receiving device a set up of nine-tenths of the divisor amount. As explained before during this set up of nine-tenths of the divisor there is a concurrent subtracting operation to diminish the amount in the dividend counter by the amount of the divisor.

*Cycle controller and column shift control upon division*

The cycle controller and column shift control upon division has the following functions. It correlates the dividend diminishing operations for each quotient place causing the machine to continue to subtract by complemental addition until the dividend entry receiving device goes back of zero. The cycle controller is then apprised of this fact by the sensing of a 9 in a particular column of the dividend entry device. It then controls the modification of machine operations to cause the introduction of a correcting factor of nine-tenths of the divisor amount into the dividend entry device, and in the present machine due to the normal ordinal operative relationship between the elements of the dividend receiving means and the elements of the .9 divisor representing means, the column shift mechanism comes into play so as to add .9 of the divisor in columns of the dividend entry corresponding in denominational order to those from which the previous subtractive entries are effected. This column shift is retained effective so that subsequent subtractive entries are effected one column to the right with respect to previous additive and subtractive entries. The sensing control for the back of zero 9 is then automatically shifted over one column to the right and this shifting is effected under the control of the cycle controller.

If no back of zero 9 is immediately obtained upon the entry of the correcting amount into the dividend entry device, dividend diminishing operations continue under the control of the cycle controller in the shifted over columnar relation. These operations continue until another back of zero 9 is sensed. If upon entry of the correcting factor a back of zero 9 condition is immediately produced the cycle controller so controls the machine that the correcting factor is again introduced and the back of zero control is again shifted. The machine operations continue until the cycle controller cooperating with the quotient place limiting device apprises the machine that no further quotient places are to be obtained. Thereupon the cycle controller functions to cause the automatic adding back of the divisor amount itself in the same columnar relation with respect to the dividend device as was used for the last diminishing operation. Accordingly the cycle controller controls the columnar relation of entries into the dividend receiving device. It controls the position of sensing the back of zero 9, shifting the position of sensing for a 9 progressively to the right as quotient places are obtained. It controls the introduction selectively of either the complement of the divisor, nine-tenths of the divisor amount or the divisor amount itself into the dividend entry receiving device.

Before explaining how the concurrent subtracting operation is effected, it may be mentioned that there is a cycle and column shift control associated with one section of the readout of the dividend entry receiving device for the purpose of controlling the columns in which entries for diminishing the dividend amount are to be introduced into the dividend accumulator and for controlling the number of cycles for such diminishing operations. This cycle and column shift controller is controlled from one of the readout sections of the DDRO device (Fig. 1j).

The column shift and cycle controller is so biased that for the first operation the entry of the complement of the amount of the divisor will be introduced into the dividend counter in the most extreme left-hand positions thereof in which entries are standing. This is provided for by the transfer contacts Yu—3 (Figs. 1g, etc.) which in starting condition are in the position shown. On dividing it may be explained that a plug connection is made from socket 267 (Fig. 1c) to socket 114 (Fig. 1g). Accordingly upon closure of cam contacts CC—10 current will flow from the 418 line, through relay contacts N—2 now closed, through cam contacts CC—10, through the plug connection from socket 267 to 114 (Fig. 1g) thence through the Yu—3 transfer contacts now in the position shown, through a plug connection from socket 123 to 136, thence through the CSth magnet and back to the other side of the line. Energization of coil CSth will close its related multi-contacts (see Fig. 1j) and allow the complemental impulses related to the amount of the divisor to flow from the DRIV readout over via lines 427 (Figs. 1h and 1c), to and through the ZRI—5 relay contacts now in the position shown out via plug connections from sockets 309 to 305 to sockets 228 to 224 (Fig. 1j), thence through the related multi-contacts of the CSth column shift relay and thence to the 423DD accumulator magnets. Accordingly the complement of the amount of the divisor will be introduced into the DD receiving device. The CSth magnet (Fig. 1g) will be maintained energized during the entry part of the cycle by a circuit which extends from line 419, coil CSth, stick contacts CSth—1, cam contacts CC—4, plug connection from socket 112 to 83, wire 434, back to line 418.

Concurrently with the introduction of the first complement of the divisor amount into the dividend accumulator, a 9 is entered into the column of the dividend accumulator next to the left of the one receiving the entry, i. e. the furthest left-hand order of this accumulator. This is provided for by a circuit traced as follows. Referring to Fig. 1f, alternating current impulses flow from line 417, through relay contacts H—I now closed, through a plug connection between sockets 43 and 44, through cam contacts FC—9 which close at the 9 index point of time in the cycle of operation of the machine, thence through line 454 (Figs. 1f, 1g, 1h and 1j) and to the extreme left-hand magnet 423 of the DD receiving device.

Upon completion of this first operation in which the .9 divisor amount is created and the complement of the divisor amount is introduced into the dividend accumulator DD, relay contacts Val—5 will shift back to the position shown in the circuit diagram, thereby interrupting the entry circuits to the 423 .9DR entry device magnets and preventing further change of the setup in this device. The emitter 401, however, will continue in operation and continue to emit impulses over the circuits previously traced, to the 423DD accumulator magnets. The amount standing in the DD counter will be accordingly diminished by progressive subtracting operations which are performed by complemental addition until the order wheel pertaining to the highest order dividend column receiving an entry from the DRIV readout stands at 9. With this index wheel standing at 9, a circuit will be completed from the 418 line (Fig. 1c), through the N—2 relay contacts now closed, through cam contacts CC—8, through a plug connection from socket 277 to socket 46 (Fig. 1f), through the non-shifted Yu—2 transfer contacts, from socket 49, back to socket 285 (Fig. 1c), thence through the I—V relay coil, back through a wire in cable 455 (Figs. 1c, 1d and 1f), through the brush of the DDRO readout which is standing at 9 and out via wire 456 to the 419 side of the D. C. line. The coil I—V, being thus energized, is held energized for a short time by stick contacts I—V—I, the return circuit being via a plug connection from socket 286 (Fig. 1c) to socket 45 (Fig. 1f), through cam contacts CC—I, thence via plug connection from socket 47 back to socket 287 (Fig. 1c), thence through the N—2 relay contacts to line 418. The energization of relay coil I—V effects closure of pickup contacts I—V—2 and a circuit will be completed from the 418 line, through relay contacts N—2, cam contacts CC—9, through relay contacts R—2 now closed, through relay contacts I—V—2 now closed, from plug socket 276, via a plug connection to socket 86 (Fig. 1g) and thence through relay coil Yu to energize such relay coil. The energization of relay coil Yu will shift the Yu—2 and Yu—3 transfer contacts to reverse position from that shown (Figs. 1f and 1g respectively). The Yu relay coil is maintained energized by a circuit which extends from line 419, coil Yu, stick contacts Yu—I, a plug connection from socket 102 to socket 269 (Fig. 1c), relay contacts N—2, to line 418. After relay coil Yu has become energized relay coil I—V is de-energized.

The foregoing operations take place when the dividend accumulator goes back of zero. With the dividend receiving device back of zero it will be understood from the preceding general description that the operation is to interrupt introduction of complements of the divisor amount into the dividend accumulator and to introduce therein nine-tenths of the divisor amount in the dividend receiving means. The energization of relay coil I—V will have also closed relay contacts I—V—3 (Fig. 1e) and with such contacts closed when cam contacts CC—13 close, relay coil W will be energized. A stick circuit will be provided for relay coil W through stick contacts W—I and cam contacts CC—14. With relay coil W energized relay contacts W—2 and W—3 (Fig. 1h) will be shifted to reverse position from that shown. The energization of relay coil W will also close contacts W—4 (Fig. 1g).

Upon the next cycle, upon closure of cam contacts CC—10 (Fig. 1c) several operations take place concurrently. The column shift relay coil CSh is energized (Fig. 1g), transfer contacts Yu—3 being already shifted to reverse position from that shown in the diagram and transfer contacts Yua—3 being in the position shown. With relay coil CSh energized, the corresponding column shift contacts (Fig. 1j) will be closed. With relay coil W energized, relay contacts W—4 (Fig. 1g) will be closed and at the proper time in the cycle cam contacts CC—10 close a circuit will be completed from line 418 (Fig. 1c), relay contacts N—2, through cam contacts CC—10, via socket 268 to socket 143 (Fig. 1g) through the R—3 relay contacts now closed, through the W—4 relay contacts now closed to energize the ZR relay. With the ZR relay energized, contacts ZR I—5 (Fig. 1c) will be shifted to reverse position from that shown. The emitter 400 will receive current via the following path. Referring to Fig. 1h, current will flow from A. C. line 417, via plug connection from socket 208 to 211, through the shifted W—3 relay contacts, via plug connection from socket 213 to 209. With current supply thus provided for emitter 400, current impulses flow to the lines 425, thence through the transverse bus lines of the .9 DR readout, out via the 437 lines through the 457 lines, over to Fig. 1c and through the ZR I—5 relay contacts now shifted, out through plug connections from sockets 309 to 305 to sockets 228 to 224 (Fig. 1j) through the now shifted multi-contacts pertaining to relay CSh and to the 423 DD receiving device magnets. Accordingly, nine-tenths of the amount of the divisor will be read out from the .9 DR accumulator and will be introduced into the DD receiving device in the shifted over columnar relation therein provided for by the column shift relay. This will introduce nine-tenths of the amount of the divisor into the dividend accumulator.

The effect of this is the same as adding the amount of the divisor and again subtracting it in shifted over columnar relation in the dividend receiving device. After this operation is completed there is again a sensing of the dividend accumulator to determine whether or not this device has again gone back of zero and, if it has not gone back of zero, a zero will appear to the left of the previously diminished dividend amount. Under these conditions the machine will then proceed to reintroduce the complement of the divisor amount into the dividend accumulator. This operation will occur by reason of the fact that relay coil W (Fig. 1e) becomes de-energized upon the opening of the stick circuit by cam contacts CC—14 and with relay coil W de-energized contacts W—2 and W—3 (Fig. 1h) shift back to the position shown in the diagram. Relay coil ZR likewise receives no current impulse at the time cam contacts CC—10 close and accordingly relay contacts ZR I—5 assume the position shown in the diagram which is the reverse of the position previously assumed. Accordingly, there is a readout from the divisor setup device through the inverting top readout section and the complement of the divisor is introduced into the dividend accumulator in proper columnar relation therein. This operation continues until a 9 appears in the dividend counter to the left of the diminished dividend amount. When such 9 appears, relay coil 2—V becomes energized. There is a closure of stick contacts 2—V—I and contacts 2—V—2 close. Relay coil Yua becomes energized, stick contacts Yua—I close, transfer contacts Yua—3 will shift to transfer column shift control to the CSt coil, etc.

*Introduction of quotient into the dividend receiving device*

The manner in which the quotient amount becomes set up in the dividend receiving device can best be understood by referring to the typical computation in Fig. 7. In this figure, it will be noticed that on the second subtracting operation in which the complementary amount 988 is added to 045624 that there is a carry-over by the usual carry-over devices in the dividend accumulator to the extreme left-hand column of 1. This figure 1 represents the quotient up to this point. Upon the next subtraction there is a further carry-over giving 2 in the extreme left-hand column of the dividend accumulator and so on. Attention is directed, however, to the fifth entry of 988. On this fifth entry the dividend receiving device goes through or back of zero. There is accordingly a 9 in the column of the dividend accumulator immediately to the right of the 3 which is at the extreme left. This 9 is indicated in the typical computation with a prime, i. e. 9'. It is this 9 which is sensed to determine that the accumulator has gone back of zero. It will also be noted that on this entry there is no carry-over to the left, the 3 remaining as a 3. However, on the following entry where 108, i. e. nine-tenths of the divisor amount is added into the dividend accumulator in shifted over columnar relation it will be noted that there is a carry-over. Accordingly, this carry-over increases the previous 3 to 4 which is the amount of the quotient in the first place. Upon the next subtracting operation the carry-over in the dividend receiving device goes into the column to the right of the column, in which the 4 stands, showing as a 1. If this typical computation is followed down it will be noted that this column progressively increases, 1, 2, 3, 4, 5, 6, 7 and that on the following computation where 988 is introduced to bring the accumulator back of zero that a 9' will again appear to the right of the 7. This 9' amount is the sensing control and this causes the introduction of nine-tenths of the divisor amount into the dividend receiving device in shifted over columnar relation therein. After the amount of 108 is introduced another 9' appears. There is accordingly a further introduction of 108 which causes the carry-over to change the 7 to 8 which is the amount of the quotient in this particular column.

From the foregoing it will be seen that the quotient amount is introduced into the dividend accumulator by the carryover action of the accumulator itself in the columns to the left of the dividend amount and by referring to the typical computation it will be seen that the quotient amount ultimately becomes introduced into columns of the dividend accumulator upon which the dividend amount previously stood.

*Mechanism for controlling number of quotient places*

According to the present invention provision is made for pre-setting the machine so that for any given computation within the limits of the capacity of the machine the quotient amount can be carried out to a pre-set and pre-determined number of places. To illustrate, consider the following typical computations, assume 8416 to be divided by 4. If this division is carried out 4 will divide into 8 and go twice. It will go into 4 in the next column once, it will not go into 1 and it will go into 16, four times. The answer will be 2104, a four place quotient. However, assume that the computation is to be 8416 divided by 9 and that a four place quotient is to be obtained. Under these conditions the 9 if divided into 8 will not go and accordingly the divisor must be shifted over out of the first position. If the 9 is again divided into 84, it will go 9 times. The remainder is 31 and 9 will go three times. The next remainder is 46 and 9 will go five times. The following operation relates to a remainder since the dividend has been completely divided and the machine will stop and the answer will be 935 with a remainder of 1. The mechanism to be described, takes care of both of these conditions, that is, it allows the quotient amount to be computed to the determined number of places or one less depending upon whether the divisor goes in the first place or not.

The switching mechanism comprises a series of brush assemblies, see 458 (Figs. 1c and 1d) fast to a shaft 459 (Fig. 5) and positioned by a single knurled wheel 460 fast to the shaft and having a cooperating pointer traversing an index. The brush assemblies cooperate with a number of readout commutators, and readout sections having eight readout segment spots corresponding to the maximum number of quotient amount places which may be obtained in this machine. In the instant machine there are seventeen readout sections, sixteen being shown on Fig. 1d of the circuit diagram and an extra one being shown on Fig. 1c.

Before a computation is started the knurled knob 460 (Fig. 5) is turned to bring the pointer to a numeral on the index corresponding to the maximum places to which the quotient amount is to be computed.

The place mechanism will first be described in connection with the typical computation of Fig. 7 and it will be assumed that the mechanism is set for a four place quotient amount.

Referring to Fig. 7, attention is directed to the third line from the bottom. Here the following numbers appear; 4 8 0 1 9' 8 8 0 0 0. The underlined numerals are the quotient figures obtained by the preceding steps of the computation. The 9' in the position to the right of the 1 signifies that the machine has gone back of zero. It will be noted further that four quotient places have been obtained and that the machine has gone back of zero. Upon the next computation instead of introducing nine-tenths of the divisor amount into the dividend receiving device in shifted over columnar position therein the mode of operation must be changed to introduce the divisor amount itself into the dividend accumulator in non-shifted over columnar relation therein. Notice the introduction of 12 in line 2 from the bottom of the computation. The purpose of this is to obtain the final value of the quotient, i. e. 4 8 0 2 and the true value of the remainder, which in this instance is zero.

When the machine senses the 9' above referred to in line 3 from the bottom of the computation of Fig. 7, relay coil 4—V (Fig. 1c) becomes energized and is maintained energized by stick contacts 4—V—1. Each of the V relay coils has further supplementary relay contacts designated 1—V—4, 2—V—4, etc., which are associated with the quotient place determining mechanism (Fig. 1c). The purpose of these relay contacts is to prevent a related Y relay coil from becoming energized upon the energization of a V relay coil which is the normal procedure. By preventing Yta, for example, from becoming energized, the column shift will be suppressed. The circuit will now be traced. Upon energization of relay coil 4—V (Fig. 1c) relay contacts 4—V—4 become closed and a circuit is established from the 418 side of the line (Fig. 1c), through cam contacts CC—11, through relay contacts 4—V—4, through brush 458a at position 4, to common strip 461, through relay coil R and back to the 419 side of the line. The energization of relay coil R establishes a stick circuit through stick contacts R—1, which extend back to the line through relay contacts N—2. With relay coil R energized relay contacts R—2 open prior to the time that cam contacts CC—9 close. Accordingly, relay coil Yta will not become energized.

The energization of R will also open relay contacts R—3 (Fig. 1g) and prevent the energization of relay coil ZR at the time cam contacts CC—10 close. Accordingly, relay contacts ZR 1—5 (Fig. 1c) will remain in non-shifted position and there will be a read out of the divisor amount itself from the DRIV readout by means of emitter 400. This readout of the divisor amount is from the DRIV readout and is controlled in the following manner. At the time relay coil 4—V (Fig. 1c) becomes energized, relay contacts 4—V—3 (Fig. 1e) close and bring about energization of relay coil W upon closure of cam contacts CC—13. With relay coil W energized, there is a shift of relay contacts W—2 and W—3 (Fig. 1h) to reverse position from that shown. Relay contacts W—3 in shifted position provide current supply for emitter 400 and with this emitter 400 in operation the amount of the divisor is read out from the DRIV readout and the impulses flow over lines 427 through the non-shifted ZR 1—5 relay contacts (Fig. 1c), through plug connections made from sockets 309 to 305 to sockets 228 to 224 (Fig. 1j), through the CSu column shift contacts and to the 423DD magnets. The result of this action is that the amount of the divisor, i. e. 12 in the illustrated computation is added into the dividend accumulator. When the machine operates to read out the true amount of the divisor itself, instead of the nine-tenths divisor amount the quotient computing operation of the machine is terminated. That is, if relay contacts ZR 1—5 are in non-shifted position and with relay coil W energized, the operations are terminated. The control for the termination of such operation is as follows. With relay contacts ZR—6 (Fig. 1e) in the position shown, which is the position which they assumed with contacts ZR 1—5 in non-shifted position, a circuit is completed through cam contacts CC—15 to energize relay coil T. A stick circuit for coil T is established through relay contacts T—1 and cam contacts CC—16. With relay coil T energized, relay contacts T—2 open to break the stick circuit for relay coil N. Accordingly, relay contacts N—2 (Fig. 1c) open. Opening of such contacts interrupts the circuit to all the V relay coils and breaks the circuit through the 9 sensing spots of the DDRO readout. Such opening likewise breaks the holding circuits for all of the Y relay coils and breaks the holding circuit for the R relay coil.

By the foregoing controls, division operations are terminated and the machine is ready to record the quotient and remainder.

Before describing the manner in which recording operations are brought about, the operation of the machine will be explained with respect to a problem in which a divisor amount fails to divide into the dividend amount in the first place. A typical computation in which this action occurs would be in dividing 57663 by 7953. With such a problem the nine-tenths of the divisor amount is 71577. In performing this computation the entries would be as follows. The first line in the following example shows the set up on the dividend entry device, the second line shows the introduction of the complement of the divisor amount thereinto, the third line shows the result of this addition and the fourth line shows the introduction of the nine-tenths divisor amount into the dividend entry device.

```
1 ------------------------------  0 0 5 7 6 3
2 ------------------------------  9 9 2 0 4 7
                                  -----------
3 ------------------------------  9 9 7 8 1 0
4 ------------------------------      7 1 5 7 7
                                  -----------
                                  0 0 4 9 6 7 7
                                      9 2 0 4 7
                                  -----------
                                      0 1 4 1 7 2 4
```

From line 3 of the foregoing it will be noted that the divisor did not go in the first place, 9' signifying that the divisor fails to go. Upon the presence of this 9' in this position, the machine senses it. Accordingly, relay coil 1—V would become immediately energized. Such relay coil 1—V is provided with supplemental relay contacts 1—V—5 (Fig. 1c). With such contacts closed, upon closure of cam contacts FC—10, a circuit is established to energize a relay coil S. With S energized, stick contacts S—1 are closed to maintain S energized. The return circuit from the stick contacts S—1 extends through relay contacts N—2. With relay coil S energized, relay contacts S—2 are shifted to reverse position from that shown.

With relay coil 1—V energized, relay contacts 1—V—2 will become closed, energizing the Yu relay coil. Relay contacts 1—V—3 (Fig. 1e) will become closed, energizing relay coil W, causing shift of relay contacts W—2 and W—3 and allowing the emitter 400 to emit right through the .9DR readout so that impulses flow over the lines 437 and lines 457 (Fig. 1h) to Fig. 1c, through the now shifted ZR 1—5 relay contacts, over plug connections from the sockets 309 to 305, to sockets 228 to 224 (Fig. 1j), thence through the CSh column shift contacts to the 423 DD magnets. The result of this is to enter 71577 in the DD receiving device in shifted over columnar relation therein.

It will now be assumed that the quotient place setting mechanism is set to compute to one place. Under this condition the brush 458a (Fig. 1c) will be on the 1 spot and in contact with common strip 461. It has been previously explained that contacts S—2 are in shifted position. With relay coil 1—V energized, relay contacts 1—V—4 will be closed, but with contacts S—2 (Fig. 1c) in shifted position the circuit to relay coil R will not be completed upon closure of cam contacts CC—11. Accordingly, the machine continues successive subtracting operations until the dividend accumulator goes back of zero and thereupon dividing operations are terminated as before described.

When the divisor amount does not go into the first place of the dividend amount, a carry-over increment which is used to build up the quotient amount, no longer goes to the highest order column of the dividend accumulator, but in contradistinction goes to the next lower order column as will be clear from the fragment of the computation noted above.

It will be understood that the number of quotient amount places may be selectively controlled by placing the brush on a number spot according to the number of places of the quotient to be computed.

It will be further understood that if the divisor amount does not go in the first place in the dividend amount that the quotient amount will be computed to one less number of places, that is, if the machine is set for a four place quotient and the divisor does not go the first time, the quotient will be computed to three places and not to four because the complete whole number quotient amount is obtained before the computation has been carried out to four places.

It may be further explained that if the machine is set for a one place quotient, it will compute for a one place quotient irrespective of whether or not the divisor goes the first time into the dividend.

Recording of quotient and remainder

Before describing the recording operation it may be explained that after the card has been sensed and passes the brushes 410, it is fed through the card handling section of the machine and ultimately such card passes to the R position in the punch, closing card lever contacts 430 (Figs. 5b and 1k) energizing relay coil F and shifting relay contacts F—1 to reverse position from that shown. In starting up the machine the usual punch racks (shown in the Cunningham and Oldenboom patents) are in extreme outer position and accordingly contacts P—1, P—2, P—3 and P—5 are closed. With contacts P—5 closed, relay coil K will be energized and relay contacts K—1 will be in closed position (Fig. 1k). Upon the shifting of relay contacts F—1 and upon the closure of cam contacts CC—7, a circuit will be established to the punch clutch magnet 431. This circuit is completed to the other side of the line, through the punch contacts P—3 now closed and relay contacts K—1 also closed. The energization of the punch clutch magnet 431 will cause closure of contacts 432 which become latched closed by latch 433. Accordingly, current supply is provided for the punch driving motor M—2. The card which has been previously read and which is in the punching unit in the R position is now advanced endwise through the punch unit to a position in which punching is to commence.

The energization of relay coil T in the manner previously explained (Fig. 1e) will have closed relay contacts T—3 and upon closure of cam contacts CC—12, current supply is provided from socket 300 through a plug connection to socket 242 (Fig. 1k) to provide for the energization of relay coil B. With relay coil B energized, relay contacts B—2 (Fig. 1k) become closed to allow current to flow through punch escapement contacts 439 to the punch readout strip 440 (Fig. 1j).

With current thus supplied to the punch readout strip and with the brush of the readout standing on the first of the spots at which punching is to commence, the punching operation will start, there being a readout through one section of the DDRO readout and the energization of the punch selector magnets 441. Upon energization of relay coil B, the closure of contacts B—2 will also provide current supply to contacts 442 in the punch, which contacts are closed by interposer action, and provide for the supply of current to the punch magnet 443. Punching now proceeds and will continue until the complete quotient and remainder amounts are read out and punched.

It may be explained that in punching the quotient and remainder amounts on the card, provision must be made for controlling the placing of the quotient and remainder amounts on the card so that they will be placed thereon in proper columnar relation and so that the quotient part of the result is properly denominated. The quotient amount will have a terminating place or column position in the dividend accumulator depending upon the number of places for which the machine is set to compute the quotient, that is, the terminating point of the quotient will vary according to the number of positions for which the machine is set to compute. Obviously, the remainder will have a corresponding number of shift of positions in the dividend receiving device.

In recording results on the card the number of places to which the quotient amount is to be computed will affect the location of quotient recording and accordingly provision must be made to selectively locate the position of quotient recording in accordance with the number of places to which the quotient is to be computed. The place setting mechanism switching means are used for this purpose, such place setting mechanism switching means also control the position in which the remainder is recorded on the card.

It will be further recalled that in entering the dividend and divisor amounts into the machine that there was a shift of the entries so that the highest order digit of both the divisor and dividend amounts went to a determined position in the divisor and dividend entry devices. In recording result data the entering shift of the dividend and divisor must be taken into account. The result as to shift back for these conditions is as follows:

The number of places in which the quotient amount is shifted back to the right upon recording is equal to the number of places to which the dividend is shifted to the left less the number of places the divisor amount is shifted to the left upon entry plus 3.

It may be further explained that upon the entry of the divisor and dividend amounts into the machine into their entry devices they lose their relative denominational value. However, the extent of shift upon entry is retained in the machine and the shift back according to the above rule re-assigns denominational values to the quotient results and evaluates the quotient in terms of the relative denominational values of the originally entered divisor and dividend amounts.

Referring again to the circuit diagram the reference numeral generally designated 461 (Fig. 1d) is the place limiting switch mechanism for controlling readout of the quotient result to the punching mechanism. The switching mechanism generally designated 462 is the place setting mechanism for controlling the positioning of punching of the remainder amount according to the number of places to which the machine is set to compute the quotient. By setting the place limiting switch mechanism on the eight segment spot position the left hand eight columns leading out from the DDRO readout will be connected for recording the quotient and two columns of DDRO will be left only for recording the remainder.

By setting the mechanism on the 7 spot there will be one less column for the quotient and an additional column for the remainder, etc. Coming out from the switching mechanism 461 are a set of lines 463 and coming out of the switching mechanism 462 are a set of lines 464. The lines 464 which are the remainder lines and lead directly to sockets 25 on the insertable plug board. The plug connections as shown in the plug board table in the insertable plug board provide for punching of the remainder in the proper field of the card. Referring to the lines 463, these lines extend down to a set of pyramidical contacts 451b which are controlled by relay coils 451. Coils 451, it will be recalled, were selectively energized according to the shift of the dividend amount on entry. Pyramidical contacts 451b are wired to another set of pyramidical contacts 452b, which contacts 452b are in turn under control of relay coils 452. Coils 452, it will be recalled, were energized according to the shift of the divisor amount upon entry. The wiring of pyramidical contacts 451b and 452b with respect to each other and with respect to the incoming lines 463 and the outgoing lines 465, which extend to sockets 24 on the insertable plug board, is such that the foregoing shift back law is complied with, that is, the quotient is shifted back to the right an amount equal to the shift to the left of the dividend amount upon entry less the number of places the divisor amount is shifted to the left upon entry plus 3.

It will be understood that the plug connections of the insertable plug board provide for punching of the quotient in the proper field on the record card.

In connection with the foregoing quotient shift back control, provision must be made for providing for the punching of zeros to the left and right of the quotient amount. This is provided for by a dual control. Certain controls are provided under the control of zero circuit 466 (Figs. 1f and 1d) which feeds into the 461 and 462 switching mechanism in the manner shown to control punching of zeros to the right of the quotient and to the left of the remainder. On account of the shift back, supplemental zero punching controls must be provided which are provided for by a circuit 467 extending to certain of the 451b and 452b contacts. This circuit provides for the punching of additional zeros beyond those provided for by the previously described zero control.

Punching operations will continue until all columns are punched and ultimately the card in the punch passes to beyond the last column punching position closing contacts P—5 (Fig. 1k) and energizing relay coil K. The energization of relay coil K will close contacts K—1 to complete a circuit to the ejector magnet 444 in the punch and cause the card to be ejected.

The machine is now ready to reset the dividend and the two divisor receiving devices and such reset is initiated in the following manner. The energization of relay coil K has also closed relay contacts K—2 (Fig. 1g) and a circuit is completed from the 417 A. C. line, through relay contacts L—2 now closed, relay contacts K—2 now closed, through cam contacts CC—2, via a wire 468, through relay contacts B—3 now closed, through a plug connection from socket 145 to 146, through the 429 DD reset magnet and back to ground. Another circuit is also completed from socket 146, through a plug connection to socket 64 (Fig. 1f), thence through the DR and .9DR 429 reset magnets and the 429MP reset magnet to sockets 6 from which a plug connection is made to socket 144 (Fig. 1g). In this manner all of the entry receiving devices of the machine and the result receiving device thereof are concurrently reset. With the receiving devices reset the machine is now ready to reinitiate a card feed in the card handling section. This is brought about in the following manner. During the reset of the DD receiving device, contacts 406 (Fig. 1k) open to break the stick circuit for the 451 and 452 relay coils allowing these coils to become de-energized. The opening of reset contacts 406 also breaks the stick circuit for relay coil B. Closure of the .9DR reset contacts 407 completes a circuit to energize relay coil C. With relay coil C energized, relay contacts C—1 close and a circuit is re-established to the card feed clutch magnet 421. This re-initiates a new card feed.

What we claim is:

1. In a calculating machine including dividing means for effecting dividing operations in accordance with dividend and divisor amounts, multiplying means for effecting a multiplying operation in accordance with multiplicand and multiplier amounts, and in which said multiplying means and dividing means are selected for operation for performing the selected calculation, the combination with column shift means utilized for the multiplication and division calculations for variably directing entries as the multiplying and dividing calculations proceed, of a plurality of sequentially operated column shift control means for said column shift means commonly utilized for the foregoing dividing and multiplying means, means responsive to successive overdraft representations in a dividend representing means for causing the sequential operation of said column shift control means from higher to lower denominational order, and means forming part of said multiplying means for causing the sequential operation of said column shift control means from lower to higher denominational order.

2. In a calculating machine including dividing means for effecting a dividing operation in accordance with dividend and divisor amounts, multiplying means for effecting a multiplying operation in accordance with multiplicand and multiplier amounts, and in which said multiplying means and dividing means are selected for operation for performing the selected calculation, the combination with means comprising a plurality of sequentially operated column shift means commonly utilized for both of the foregoing dividing and multiplying means, said column shift means being individually operated for variably directing entries as dividing and multiplying operations proceed, of a plurality of control means commonly utilized for multiplication and division and including means controlled thereby for rendering said column shift means effective in succession, means responsive to successive overdraft representations in a dividend representing means for causing said control means to render said column shift means effective in succession from higher to lower denominational order, and means forming part of said multiplying means for causing said control means to render said column shift means effective in succession from lower to higher denominational order.

3. In a calculating machine including dividing means for effecting a dividing operation in accordance with dividend and divisor amounts, multiplying means for effecting a multiplying operation in accordance with multiplicand and multiplier amounts, and in which said multiplying means and dividing means are selected for operation for performing the selected calculation, the combination with a set of column shift relays commonly utilized for both of the foregoing dividing and multiplying means, of a plurality of control relays commonly utilized for multiplication and division and including means controlled thereby for rendering said column shift relays effective in succession, means responsive to successive overdraft representations in a dividend representing means for causing said control relays to render said column shift relays effective in succession from higher to lower denominational order, and means forming part of said multiplying means for causing said control relays to render said column shift relays effective in succession from lower to higher denominational order.

4. In a computing machine with computing devices including computation result receiving means, resetting means therefor, and with result recording means controlled by the result receiving means which may be completed in its recording operation during any one of successive operating cycles, and including in combination, a plurality of means selectively rendered effective for initiating resetting by said resetting means during different ones of the aforesaid cycles of operation, means cooperating with the aforesaid initiating means and effective during the successive cycles for rendering said initiating means effective in cyclic sequence, and means controlled by the result recording means and effective when recording is completed for causing the initiating means which is rendered effective during the particular cycle the recording is completed to initiate the operation of the resetting means.

JAMES W. BRYCE.
ARTHUR H. DICKINSON.